(12) United States Patent
Swimmer et al.

(10) Patent No.: US 12,314,912 B2
(45) Date of Patent: May 27, 2025

(54) METHOD AND APPARATUS FOR MANAGING FINANCIAL TRANSACTIONS FOR SELECTIVE CONVERSION TO BUY NOW, PAY LATER FINANCING

(71) Applicant: Affirm, Inc., San Francisco, CA (US)

(72) Inventors: Corey Swimmer, Palatine, IL (US); Claire Crinion, Sleepy Hollow, NY (US); Jill Fisher, San Francisco, CA (US); Sam Bodanis, Park City, UT (US); Laurie Sellick, Pacifica, CA (US); Garrett Schlesinger, Brooklyn, NY (US)

(73) Assignee: Affirm, Inc., San Francisco, CA (US)

( * ) Notice: Subject to any disclaimer, the term of this patent is extended or adjusted under 35 U.S.C. 154(b) by 131 days.

(21) Appl. No.: 17/508,236

(22) Filed: Oct. 22, 2021

(65) Prior Publication Data
US 2022/0270060 A1 Aug. 25, 2022

Related U.S. Application Data

(60) Provisional application No. 63/152,052, filed on Feb. 22, 2021.

(51) Int. Cl.
*G06Q 20/10* (2012.01)
*G06Q 20/40* (2012.01)
*G06Q 40/03* (2023.01)

(52) U.S. Cl.
CPC ......... *G06Q 20/102* (2013.01); *G06Q 20/108* (2013.01); *G06Q 20/405* (2013.01); *G06Q 40/03* (2023.01)

(58) Field of Classification Search
CPC .......................... G06Q 20/405; G06Q 40/025
See application file for complete search history.

(56) References Cited

U.S. PATENT DOCUMENTS

| 10,127,532 | B1 * | 11/2018 | Grassadonia | ...... | G06Q 30/0279 |
| 10,535,054 | B1 * | 1/2020 | Sptizer | ............... | G06Q 20/3223 |
| 10,628,815 | B1 * | 4/2020 | Woo | .................. | G06Q 20/40155 |
| 10,783,576 | B1 * | 9/2020 | Van Os | ............ | G06Q 20/40145 |
| 11,144,927 | B1 * | 10/2021 | Kolls | .................. | G06Q 20/4016 |

(Continued)

FOREIGN PATENT DOCUMENTS

WO  WO-2012088533 A1 * 6/2012 ............. G06Q 20/10

OTHER PUBLICATIONS

Napkin Finance, Credit Cards, Dec. 2020. Available at: https://napkinfinance.com/napkin/credit-cards/ (Year: 2020).*

(Continued)

*Primary Examiner* — David P Sharvin
*Assistant Examiner* — Gregory Harper
(74) *Attorney, Agent, or Firm* — Burr & Forman LLP

(57) ABSTRACT

A method of processing a customer transaction may include receiving an indication of a transaction between a customer and a vendor, checking an account status of a primary account of the customer at a customer bank, and determining, within a predetermined time of the indication, whether to accept or decline the transaction based on the account status. The method may further include, if the transaction is accepted, authorizing a transfer of funds to the vendor and communicating with the customer to determine whether to settle the transaction or handle the transaction as an installment loan to the customer.

19 Claims, 16 Drawing Sheets

(56) References Cited

U.S. PATENT DOCUMENTS

| | | | | |
|---|---|---|---|---|
| 11,443,353 | B1* | 9/2022 | Davis | H04W 4/50 |
| 2002/0194137 | A1* | 12/2002 | Park | G06Q 30/0213 |
| | | | | 705/64 |
| 2005/0177523 | A1* | 8/2005 | Weiss | G06Q 50/188 |
| | | | | 705/80 |
| 2006/0173790 | A1* | 8/2006 | Park | G07B 15/063 |
| | | | | 705/13 |
| 2011/0180598 | A1* | 7/2011 | Morgan | G06Q 20/425 |
| | | | | 235/380 |
| 2011/0238567 | A1* | 9/2011 | Ferreira Da Silva | G06Q 20/24 |
| | | | | 705/39 |
| 2012/0123875 | A1* | 5/2012 | Svendsen | G06Q 30/0261 |
| | | | | 705/14.72 |
| 2012/0166311 | A1* | 6/2012 | Dwight | G06Q 30/0617 |
| | | | | 705/26.43 |
| 2014/0122338 | A1* | 5/2014 | Cueli | G06Q 40/00 |
| | | | | 705/35 |
| 2015/0277964 | A1* | 10/2015 | Atkins | H04L 67/00 |
| | | | | 718/101 |
| 2015/0332246 | A1* | 11/2015 | Lafeer | G06Q 20/227 |
| | | | | 705/44 |
| 2016/0048822 | A1* | 2/2016 | Forrest | G06Q 30/0635 |
| | | | | 705/26.81 |
| 2017/0103388 | A1* | 4/2017 | Pillai | G06Q 20/3829 |
| 2017/0178113 | A1* | 6/2017 | Mugford | G06Q 20/102 |
| 2017/0193485 | A1* | 7/2017 | Wu | G06Q 30/0226 |
| 2018/0096335 | A1* | 4/2018 | Moghaizel | G06Q 20/405 |
| 2020/0151697 | A1* | 5/2020 | Pinto | G06Q 20/24 |
| 2021/0042722 | A1* | 2/2021 | Wolter | G06Q 20/202 |
| 2021/0049683 | A1* | 2/2021 | Jones | G06Q 40/025 |
| 2021/0073777 | A1* | 3/2021 | Bialick | G06Q 20/3223 |
| 2021/0133868 | A1* | 5/2021 | Brock | G06Q 20/4037 |
| 2021/0133894 | A1* | 5/2021 | Reses | G06Q 20/4037 |
| 2021/0150624 | A1* | 5/2021 | Tucker | G06Q 20/405 |
| 2021/0174428 | A1* | 6/2021 | Isaacson | G06Q 20/405 |
| 2022/0005034 | A1* | 1/2022 | Ravi | G06Q 20/38215 |
| 2022/0051316 | A1* | 2/2022 | Bouchard | G06Q 20/405 |
| 2022/0084134 | A1* | 3/2022 | Brock | G06N 20/00 |
| 2022/0164868 | A1* | 5/2022 | Dill | G06Q 40/02 |
| 2022/0198417 | A1* | 6/2022 | Jones | G06Q 20/047 |
| 2022/0207520 | A1* | 6/2022 | Prabhu | G06Q 20/102 |
| 2022/0207521 | A1* | 6/2022 | Prabhu | G06Q 30/0215 |

OTHER PUBLICATIONS

CardRates.com, The Average Number of Credit Card Transactions Per Day & Year, Nov. 2020. Available at: https://www.cardrates.com/advice/number-of-credit-card-transactions-per-day-year/#:~:text=Credit%20cards%20can%20settle%205%2C000,down%20by%20credit%20card%20brand (Year: 2020).*

"California Civ. Code Section 1802.6—Retail installment contract or contract", Aug. 29, 2019. Available at: https://casetext.com/statute/california-codes/california-civil-code/division-3-obligations/part-4-obligations-arising-from-particular-transactions/title-2-credit-sales (Year: 2019).*

"Stripe Payments—Payment Methods, Features, & More", Aug. 24, 2020. Available at: https://stripe.com/payments/features (Year: 2020).*

* cited by examiner

METHOD AND APPARATUS FOR MANAGING FINANCIAL TRANSACTIONS FOR SELECTIVE CONVERSION TO BUY NOW, PAY LATER FINANCING

TECHNICAL FIELD

Example embodiments generally relate to financial industry technologies and, in particular, relate to apparatuses, systems, and methods for facilitating commerce and for enabling customers to selectively control settlement terms for financial transactions after such transactions have been completed.

BACKGROUND

The financial industry is comprised of many thousands of customers, vendors, lenders, borrowers, and other bit players that all interact in various ways to enable customers to ultimately have access to goods and services provided by vendors. Credit and debit transactions have long been a way that individuals have managed point of sale transactions to ensure seamless transfer of funds from customers, or on their behalf, to vendors for relatively routine or small transactions. Meanwhile, obtaining a loan from a bank has long been the most common way of obtaining financing for non-routine or larger transactions.

In each of the cases above, a relatively rigid and pre-planned sequence of activities occurs before, during, and after the transaction is closed. The customer makes the decision up front as to which mechanism to employ, and the handling of the entire transaction after that initial decision is made follows existing and well-known paths to completion. While there is great flexibility in that many options are available to customers (particularly those with good credit), there is not much flexibility at all after the decision is made as to which option to select.

Credit cards and certain other lending vehicles may be useful tools for many customers. However, some customers can find themselves over extended either quickly or over a period of time based on the existing tools. This phenomenon has repeated itself over generations, and for millions of customers. Thus, there is now a deep desire on the part of many to create flexible and fair means of supporting customer purchasing activities that is both honest and transparent, and that also improves the lives of customers.

BRIEF SUMMARY OF SOME EXAMPLES

Accordingly, some example embodiments may enable the provision of technical means by which to give customers decision making power over how transactions should be treated after the transaction (instead of before). Such power may enable customers to have access to credit in a buy now, pay later format as a post hoc option for sales otherwise undertaken using an instrument such as a debit card (or credit card) whether virtual or physical.

In an example embodiment, a method of processing a customer transaction may be provided. The method may include receiving an indication of a transaction between a customer and a vendor, checking an account status of a primary account of the customer at a customer bank, and determining, within a predetermined time of the indication, whether to accept or decline the transaction based on the account status. The method may further include, if the transaction is accepted, authorizing a transfer of funds to the vendor and communicating with the customer to determine whether to settle the transaction or handle the transaction as an installment loan to the customer.

In another example embodiment, an apparatus for processing a customer transaction may include processing circuitry configured to receive an indication of a transaction between a customer and a vendor, check an account status of a primary account of the customer at a customer bank, and determine, within a predetermined time of the indication, whether to accept or decline the transaction based on the account status. The processing circuitry may further be configured to, if the transaction is accepted, authorize a transfer of funds to the vendor and communicate with the customer to determine whether to settle the transaction or handle the transaction as an installment loan to the customer.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
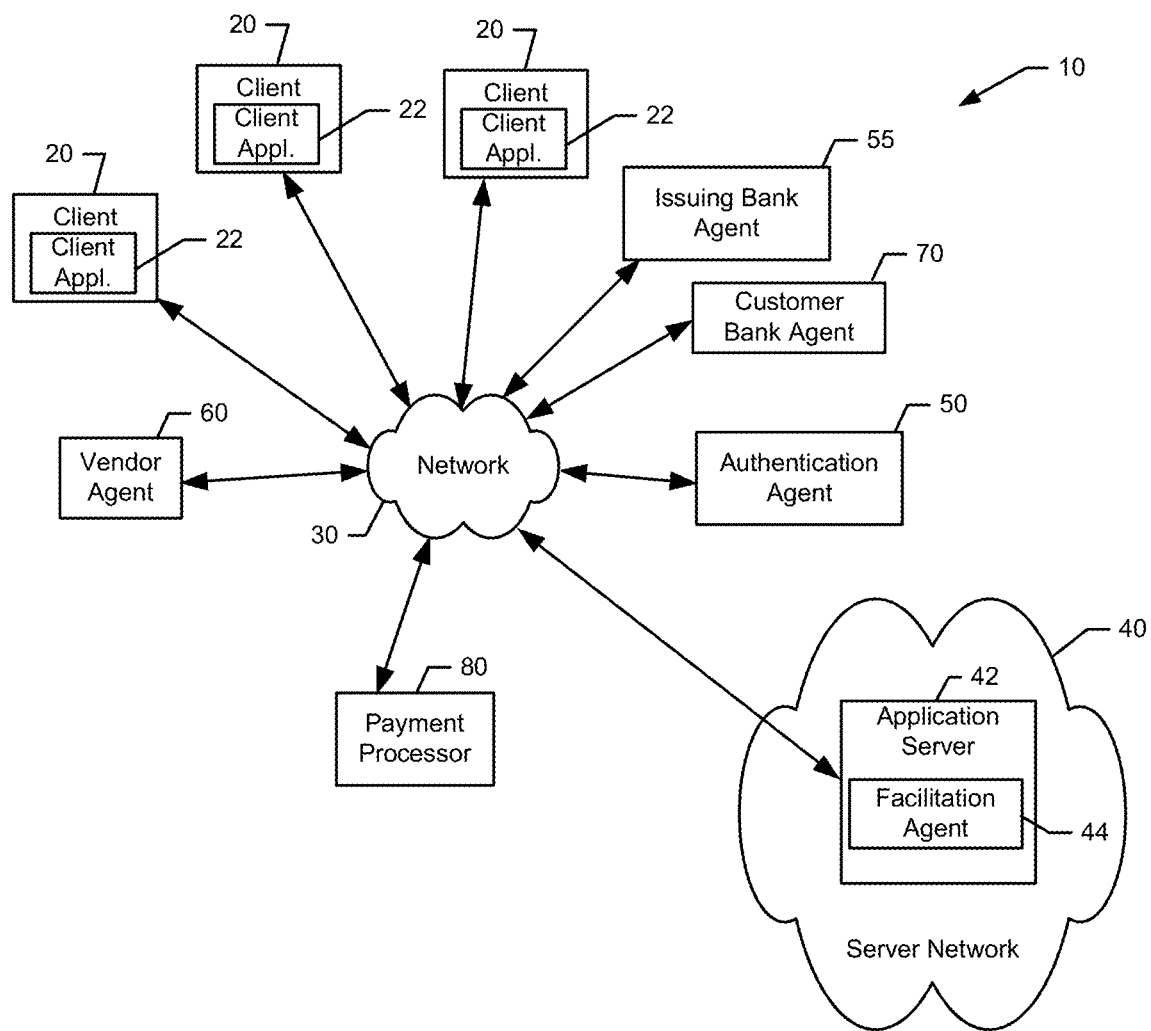
FIG. 1 illustrates a functional block diagram of a system for providing a selective financing and payment platform according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other. Additionally, when the term "data" is used, it should be appreciated that the data may in some cases include simply data or a particular type of data generated based on operation of algorithms and computational services, or, in some cases, the data may actually provide computations, results, algorithms and/or the like that are provided as services.

As used in herein, the term "module" is intended to include a computer-related entity, such as but not limited to hardware, firmware, or a combination of hardware and software (i.e., hardware being configured in a particular way by software being executed thereon). For example, a module may be, but is not limited to being, a process running on a processor, a processor (or processors), an object, an executable, a thread of execution, and/or a computer. By way of example, both an application running on a computing device and/or the computing device can be a module. One or more modules can reside within a process and/or thread of execution and a module may be localized on one computer and/or distributed between two or more computers. In addition, these components can execute from various computer readable media having various data structures stored thereon. The modules may communicate by way of local and/or remote processes such as in accordance with a signal having one or more data packets, such as data from one module interacting with another module in a local system, distributed system, and/or across a network such as the Internet with other systems by way of the signal. Each respective module may perform one or more functions that will be described in greater detail herein. However, it should be appreciated that although this example is described in terms of separate modules corresponding to various functions performed, some examples may not necessarily utilize modular architectures for employment of the respective different functions. Thus, for example, code may be shared between different modules, or the processing circuitry itself may be configured to perform all of the functions described as being associated with the modules described herein. Furthermore, in the context of this disclosure, the term "module" should not be understood as a nonce word to identify any generic means for performing functionalities of the respective modules. Instead, the term "module" should be understood to be a modular component that is specifically configured in, or can be operably coupled to, the processing circuitry to modify the behavior and/or capability of the processing circuitry based on the hardware and/or software that is added to or otherwise operably coupled to the processing circuitry to configure the processing circuitry accordingly.

Some example embodiments described herein provide for a data processing platform that can be instantiated at an apparatus comprising configurable processing circuitry. The processing circuitry may be configured to execute various processing functions on financial data using the techniques described herein. The data processing platform may, for example, be configured to provide an information exchange via which multiple independent or even proprietary platforms may be connected to each other. As such, the data processing platform may be embodied as a selective financing and payment platform (i.e., SFP platform) that connects customers and merchants (or vendors) to banks, payment services, and a transaction facilitator within the financial industry. By enabling data between the players on or members of the platform to be shared, and by further providing customers with tools for using the platform to manage individual transactions within a given period of time after the transactions occur, customers may have increased flexibility for managing their funds in a way that prevents over-extension, while still maximizing their access to the goods and services they desire or need at any given time. Moreover, the platform may be employed under the management of the facilitator to control the usage of data on mutually agreeable terms for all participants who access the platform. Accordingly, a commercial framework can be provided by a technical platform designed to connect customers with access to financial support to effect transactions in real time without the need for deciding, before the transaction, how it will be settled. In other words, instead of merely initiating a platform for supporting buy now, pay later transactions, example embodiments provide customers with technical means by which to buy now, and decide how to pay later. This stands in contrast to today's paradigm in which only before selecting the payment method does the customer have control over the way the transaction will be treated thereafter. The creation of one platform, managed by the facilitator, for the interaction of multiple parties to enable post hoc determination of how a transaction will be settled provides a flexible and yet cohesive experience for customers that maximizes responsible access to financial freedom and satisfaction.

Within this context, a transaction is considered "settled" when all parties involved in the transaction have received any payments or funds that may be owed to them. Thus, if cash is paid to the vendor by the customer, the transaction is immediately settled. For a credit card purchase, the transaction may be settled when the vendor has received funds from a bank associated with the credit card, and the customer has paid the bank accordingly so that the bank has also received the funds it advanced on behalf of the customer to the vendor. Example embodiments may allow a transaction to proceed as if a normal credit or debit card purchase as far as the vendor is concerned. However, the customer may later decide to change the nature of the transaction from a debit purchase to a loan (e.g., a buy now, pay later loan). In this context, a buy now, pay later loan should be considered to be an installment loan, or a loan that has a fixed payment amount and term for making such payments. In other words, the buy now, pay later or installment loan does not have a conventional interest rate that applies over whatever indeterminate period of time the customer chooses to keep the loan by not paying off the entire principal.

Example embodiments not only provide the SFP platform, but also provide various enabling technologies that may facilitate operation of the SFP platform itself or of modules that may interact with the SFP platform. Example embodiments may also provide for enhancement of functionalities associated with the environment that is created by the SFP platform. The SFP platform may provide a mechanism by which to enhance commerce in a responsible way that is both empathetic and empowering to customers.

An example embodiment of the invention will now be described in reference to FIG. 1, which illustrates an example system in which an embodiment of the present invention may be employed. As shown in FIG. 1, a system comprising an SFP platform 10 according to an example embodiment may include one or more client devices (e.g., clients 20). Notably, although FIG. 1 illustrates three clients 20, it should be appreciated that a single client or many more clients 20 may be included in some embodiments and thus, the three clients 20 of FIG. 1 are simply used to illustrate a potential for a multiplicity of clients 20 and the number of clients 20 is in no way limiting to other example embodiments. In this regard, example embodiments are scalable to inclusion of any number of clients 20 being tied into the system 10. Furthermore, in some cases, some embodiments may be practiced on a single client without any connection to the system 10.

The clients 20 may, in some cases, each be associated with a single individual or customer. However, in some embodiments, one or more of the clients 20 may be associated with an organization (e.g., a company) or group of individuals (e.g., a family unit). In general, the clients 20 may be referred to as members of the environment or community associated with the SFP platform 10.

Each one of the clients 20 may include one or more instances of a communication device such as, for example, a computing device (e.g., a computer, a server, a network access terminal, a personal digital assistant (PDA), radio equipment, cellular phone, smart phone, or the like) capable of communication with a network 30. As such, for example, each one of the clients 20 may include (or otherwise have access to) memory for storing instructions or applications for the performance of various functions and a corresponding processor for executing stored instructions or applications. Each one of the clients 20 may also include software and/or corresponding hardware for enabling the performance of the respective functions of the clients 20 as described below. In an example embodiment, the clients 20 may include or be capable of executing a client application 22 configured to operate in accordance with an example embodiment of the present invention. In this regard, for example, the client application 22 may include software for enabling a respective one of the clients 20 to communicate with the network 30 for requesting and/or receiving information and/or services via the network 30 as described herein. The information or services receivable at the client applications 22 may include deliverable components (e.g., downloadable software to configure the clients 20, or information for consumption/processing at the clients 20). As such, for example, the client application 22 may include corresponding executable instructions for configuring the client 20 to provide corresponding functionalities for sharing, processing and/or utilizing financial data as described in greater detail below.

The network 30 may be a data network, such as one or more instances of a local area network (LAN), a metropolitan area network (MAN), a wide area network (WAN) (e.g., the Internet), and/or the like, which may couple the clients 20 to devices such as processing elements (e.g., personal computers, server computers or the like) and/or databases. Communication between the network 30, the clients 20 and the devices or databases (e.g., servers) to which the clients 20 are coupled may be accomplished by either wireline or wireless communication mechanisms and corresponding communication protocols.

In an example embodiment, devices to which the clients 20 may be coupled via the network 30 may include one or more application servers (e.g., application server 40), and/or a database server 42, which together may form respective elements of a server network 32. Although the application server 40 and the database server 42 are each referred to as "servers," this does not necessarily imply that they are embodied on separate servers or devices. As such, for example, a single server or device may include both entities and the database server 42 could merely be represented by a database or group of databases physically located on the same server or device as the application server 40. The application server 40 and the database server 42 may each include hardware and/or software for configuring the application server 40 and the database server 42, respectively, to perform various functions. As such, for example, the application server 40 may include processing logic and memory enabling the application server 40 to access and/or execute stored computer readable instructions for performing various functions. In an example embodiment, one function that may be provided by the application server 40 may be the provision of access to information and/or services related to the SFP platform 10, and more particularly relating to facilitating transactions where the details of setting the transaction will be determined after the transaction. For example, the application server 40 may be configured to provide for storage of information descriptive of events or activities associated with the SFP platform 10 and the execution of a financial transaction on behalf of a customer in real time, while delaying the customers decision on how to settle the transaction to a later time. In some cases, data and/or services may be exchanged amongst members, where specific needs or desires of the members are aligned with respect to playing their respective roles in connection with conducting a financial transaction, and enabling the settlement method for the transaction to be determined at a later time.

In some embodiments, for example, the application server 40 may therefore include an instance of a facilitation agent 44 comprising stored instructions for handling activities associated with practicing example embodiments as described herein. The facilitation agent 44 may be a technical device, component or module affiliated with the facilitator of the functioning of the SFP platform 10. Thus, the facilitation agent 44 may operate under control of the facilitator to be a technical means by which to carry out activities under direction of the facilitator or employees thereof. As such, in some embodiments, the clients 20 may access the SFP platform 10 services, and more particularly contact the facilitation agent 44 online and utilize the services provided thereby. However, it should be appreciated that in other embodiments, an application (e.g., the client application 22) enabling the clients 20 to interact with the facilitation agent 44 (or components thereof) may be provided from the application server 40 (e.g., via download over the network 30) to one or more of the clients 20 to enable recipient clients to instantiate an instance of the client application 22 for local operation such that the facilitation agent 44 may be a distributor of software enabling members or parties to participate in operation of the SFP platform 10. Alternatively, another distributor of the software may provide the client 20 with the client application 22, and the facilitation agent 44 may communicate with the client 20 (via the client application 22) after such download.

In an example embodiment, the client application 22 may therefore include application programming interfaces (APIs) and other web interfaces to enable the client 20 to conduct business via the SFP platform 10. The client application 22 may include a series of control consoles or web pages including a landing page, onboarding services, activity feed, account settings (e.g., user profile information), transaction management services, payment management services and the like in cooperation with a service application that may be executed at the facilitation agent 44. Thus, for example, the client application 22 may enable the customer to review monthly statements, request a physical credit or debit card, turn on or off a virtual or digital card, access or adjust information associated with the customer account, or receive help or other information. Budgeting tools and other useful information and other useful tools for managing the finances of the customer may also be available via the client application 22 in some cases.

In an example embodiment, the application server 40 may include or have access to memory (e.g., internal memory or the database server 42) for storing instructions or applications for the performance of various functions and a corresponding processor for executing stored instructions or applications. For example, the memory may store an instance of the facilitation agent 44 configured to operate in accordance with an example embodiment of the present invention. In this regard, for example, the facilitation agent 44 may include software for enabling the application server 40 to communicate with the network 30 and/or the clients 20 for the provision and/or receipt of information associated with performing activities as described herein. Moreover, in some embodiments, the application server 40 may include or otherwise be in communication with an access terminal (e.g., a computer including a user interface) via which individual operators or managers of the entity associated with the facilitation agent may interact with, configure or otherwise maintain the SFP platform 10 and/or the facilitation agent 44.

As such, the environment of FIG. 1 illustrates an example in which provision of content and information associated with the financial industry (e.g., including at least some data provided to/from customers and/or vendors in real-time) may be accomplished by a particular entity (namely the facilitation agent 44 residing at the application server 40). Thus, the facilitation agent 44 may be configured to handle provision of content and information associated with tasks that are associated only with the SFP platform 10. Access to the facilitation agent 44 may therefore be secured as appropriate for the individuals or organizations involved and credentials of individuals or organizations attempting to utilize the tools provided herein may be managed by digital rights management services or other authentication and security services or protocols that are outside the scope of this disclosure.

The SFP platform 10 may also operate in cooperation with a bank authentication agent 50, an issuing bank agent 55, a vendor agent 60, a customer bank agent 70, and a payment processor 80. The facilitation agent 44 may be configured to interact with, or otherwise facilitate interactions between, each of the bank authentication agent 50, the issuing bank agent 55, the vendor agent 60, the customer bank agent 70, and the payment processor 80 in order to carry out example embodiments as described herein. Thus, each of the bank authentication agent 50, the issuing bank agent 55, the vendor agent 60, the customer bank agent 70, and the payment processor 80 should be understood to be a computer, server, smart phone, or other technical component or module associated with a respective party (e.g., an authenticating bank, issuing bank, a vendor, a customer bank, and a payment service, respectively) that is capable of communication with other parties via the network 30, and under control of or responsive to facilitating communication by the facilitation agent 44.

The issuing bank may be a bank or other financial services provider. The issuing bank may have a persistent relationship with the entity associated with the facilitation agent 44 (e.g., the facilitator), but generally need not have any persistent or pre-existing relationship with the customer or the customer bank. The issuing bank may be contracted with or otherwise have a pre-existing relationship with the facilitation agent 44 (and entity associated therewith) that enables the facilitation agent 44 to facilitate transactions on behalf of the customer when certain conditions (agreed upon in advance by the entity associated with the facilitation agent 44 and the issuing bank) are met associated with a transaction undertaken (or attempted) by the customer via the client 20 and client application 22. For example, the issuing bank may be the issuer of the debit or credit card on behalf of the facilitation agent 44 and be responsible for directly paying the merchants and vendors during a transaction initiated by the customer via the debit or credit card.

The bank authenticator may be an agent or financial service provider capable of granting the facilitation agent 44 access to the customer bank to view account balances and credentials. The balances and credentials may be used or relied upon to pull or push funds from or to the customer bank using the payment processor 80. Thus, for example, the bank authenticator may utilize its own software, application programming interfaces (APIs) or the like that define an infrastructure or intermediary platform to connect a customer's bank account with the facilitation agent 44.

The customer bank may be a bank at which the customer (i.e., associated with one of the clients 20) deposits money in a bank account such as a savings account or a checking account. In an example embodiment, the customer may subscribe or register to a service or request a card (e.g., a credit card, debit card or other virtual or digital card) from the facilitation agent 44 to enroll the customer as a member of the SFP platform 10. During subscription or registration, the customer may be prompted (via the client 20 and client application 22) by the facilitation agent 44 to provide account details identifying the savings account or checking account (i.e., a customer account) at the customer bank. The customer may, by registering or subscribing, further authorize the facilitation agent 44 to conduct specific activities related to the customer account when corresponding conditions are met, which may be facilitated by one of or a combination of the bank authenticator and the issuing bank as described above. The activities may include checking account status (i.e., checking a current balance of funds deposited in the customer account) and/or authorizing withdrawal of funds from the customer account by the payment processor 80 in order to settle a transaction or make payments to the facilitation agent 44.

The payment processor 80 may be an agent or service that facilitates the acceptance and/or sending of payments between parties online. Thus, for example, the payment processor 80 may utilize its own software, application programming interfaces (APIs) or the like that define an infrastructure or payment platform to connect businesses or companies to manage their businesses or transactions online.

The customer bank agent 70 may change for each respective one of the clients 20 (and therefore for each respective customer). Similarly, the vendor agent 60 may change for each respective transaction since different vendors may be involved in different transactions involving the clients 20. In some examples, the bank authentication agent 50 and the payment processor 80 may remain the same entities across all transactions managed by the facilitation agent 44. However, the facilitation agent 44 could use different bank authentication agents in different geographic areas or jurisdictions, and the payment processor 80 may also change on the same bases. In some cases, the facilitation agent 44 may use different bank authentication agents 50 in order to ensure all customers' banks can be accommodated. For example, if the customer bank was not serviced by a first bank authentication agent, the facilitation agent 44 is configured to swap in a second bank authentication agent that would allow for servicing of the customer bank. Accordingly, the facilitation agent 44 is configured to swap each of the payment processors 80 and the bank authentication agents 50 under certain circumstances. For example, the bank authentication agent 50 may be swapped by the facilitation agent 44 if the bank authentication agent 50 is temporarily offline or if the bank authentication agent 50 did not support a customer bank.

As noted above, the SFP platform 10 may operate to enable the customer associated with a given one of the clients 20 to make a purchase in real time from a vendor associated with the vendor agent 60. In some example embodiments, the client application 22 may be used in connection with setting up the account details that are then used as the basis for managing interactions between the parties shown in FIG. 1 under control of the facilitation agent 44. In this regard, for example, the client application 22 may be used to engage (e.g., via a website and corresponding APIs) with the facilitation agent 44 to set up an account with the facilitation agent 44 for services associated with the SFP platform 10. The facilitation agent 44 may prompt the client 20 to provide account details associated with the customer bank agent 70 and may provide terms and conditions (electronically or via mail or other communication means) that the customer may accept to establish a user profile and user account with the facilitation agent 44. In some cases, the customer may be provided with a card (e.g., a debit card or credit card) or other physical implement that can be used to initiate transactions with vendors. As noted above, the card may be issued by the issuing bank. The card may be associated with the user account, and may provide identifying information needed to initiate operation of the SFP platform 10 (and the facilitation agent 44) as described herein when the customer uses the card to make a purchase with a vendor. The card may be physically presented for such purpose and magnetic strip, chip or other technologies may be used in connection with initiating the transaction. Otherwise, the card number provided on the card may be unique to the user account, and may be provided to the vendor to initiate the transaction. Finally, as an additional or alternative way to initiate a transaction, the card may be virtual and may exist in a mobile wallet or other smartphone context for initiating transactions online. In such a context, the client application 22 may also or alternatively be the means by which the transaction is initiated or handled. Thus, it should be appreciated that the client application 22 could be used to set up the user account and user profile and/or to conduct individual transactions.

During establishment of the user account, the customer may provide an identification of the customer bank associated with the customer bank agent 70, and may also provide details for the savings or checking account that the customer maintains at the customer bank. The customer may also authorize the facilitation agent 44 to make real time (or anytime) checks on account status (e.g., account balance) or to make periodic routine checks of the same. Thus, for example, for each transaction, the facilitation agent 44 may be enabled to check the account balance of the customer. Alternatively or additionally, the facilitation agent 44 may make routine checks or snapshot looks at the account balance. For example, a check may be made every day at a certain time, every two or three days, or at other standard or random intervals. The account status of the customer bank may be used by the facilitation agent 44 in facilitating payment transactions, and deferred decision making as to how to settle such transactions as described in greater detail below.

The issuing bank may have an agreement or relationship with the entity associated with the facilitation agent 44 that enables the facilitation agent 44 to engage the issuing bank to extend funds to a merchant or vendor on behalf of the customer in response to instruction from the facilitation agent. The facilitation agent 44 may therefore coordinate communications and funds transferring between members or parties of the SFP platform 10 to facilitate payment transactions that can be settled later or in ways selected specifically by the customer. In this regard, the customer may approach the vendor (physically or virtually) in order to initiate a transaction. The card (virtual or physical) may be provided for payment, and the corresponding indication of a pending transaction may be communicated (e.g., via the SFP platform 10 by the vendor agent 60 and/or the client 20 via the network 30. The communication and activities that ensue thereafter will now be described greater detail below.

Figure 3:
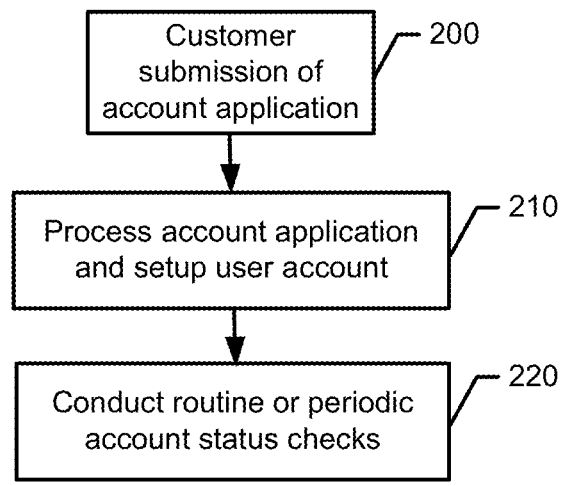
FIG. 3 illustrates a block diagram showing control flow for account setup in accordance with an example embodiment.
Figure 4:
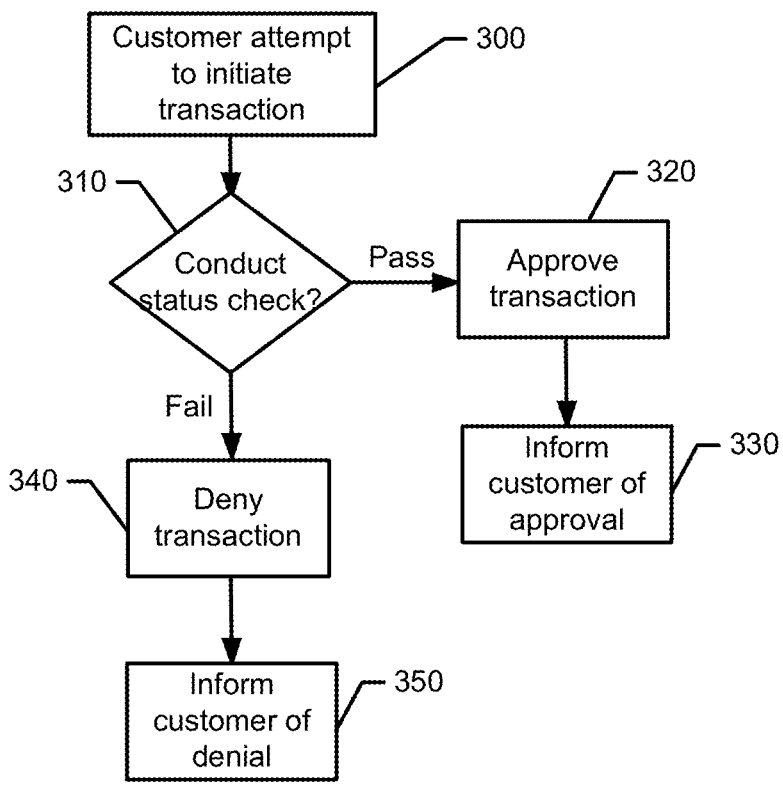
FIG. 4 illustrates a block diagram for control flow associated with initial transaction handling in accordance with an example embodiment.
Figure 5:
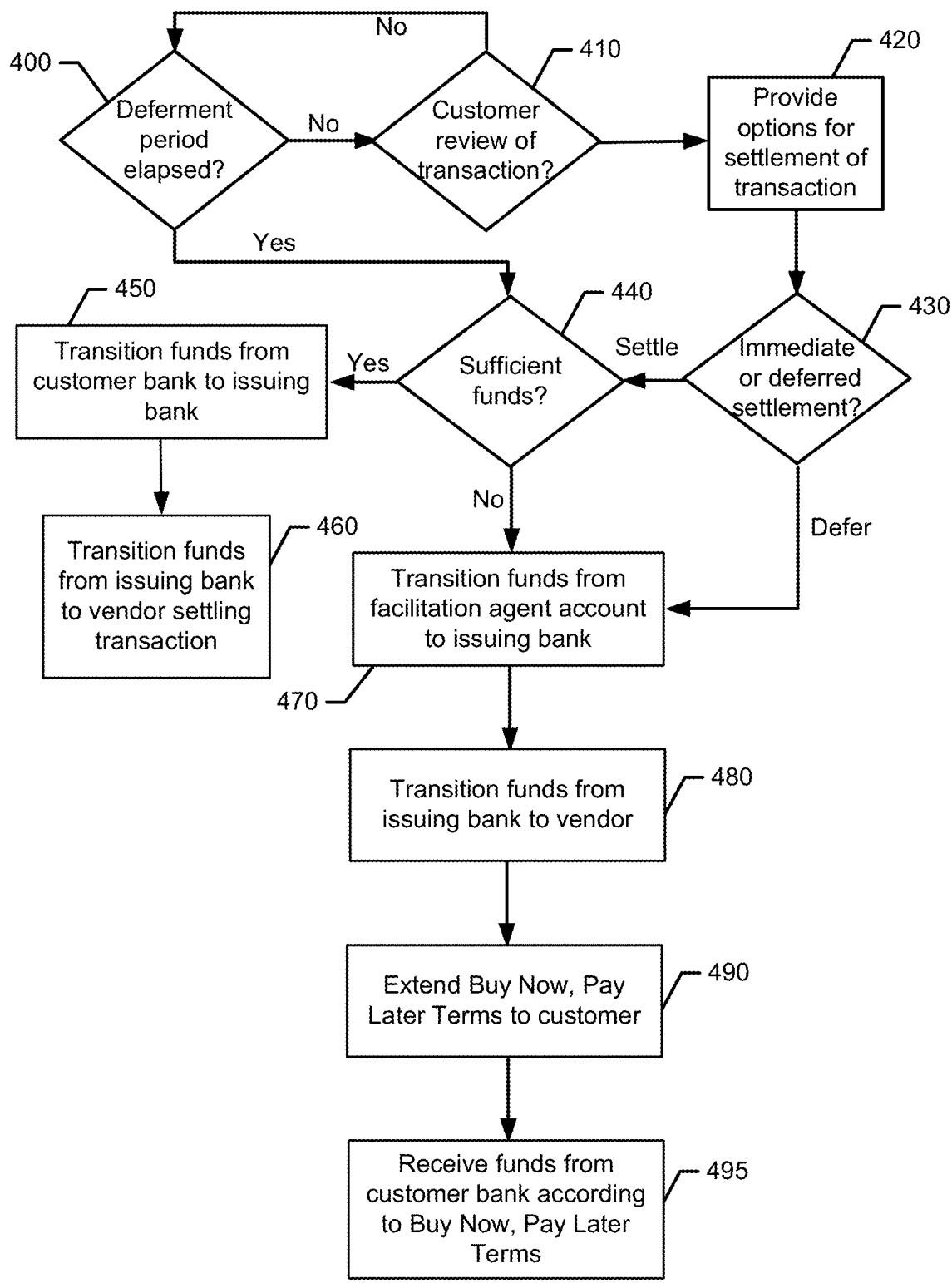
FIG. 5 illustrates a block diagram of control flow for intermediate handling and settlement of the transaction in accordance with an example embodiment.

Regardless of how the transactions are initiated, the SFP platform 10 of FIG. 1 may be used before, during and after the time of the transaction in order to enable the facilitation agent 44 to set up the user account, make determinations necessary to initiate the transactions in real time responsive to initiation of the transaction, facilitate enabling the customer to decide (after the transaction) how to settle the transaction, and then coordinate settlement of funds associated with the transaction at the appropriate time. Each of these activities may have its own respective timing and communications that are facilitated by the facilitation agent 44 and FIGS. 3-5 illustrate example control flows associated with each respective scenario. However, prior to examining each respective scenario, the structures associated with an apparatus at which the facilitation agent 44 of an example embodiment may be instantiated will be described in reference to FIG. 2.

Figure 2:
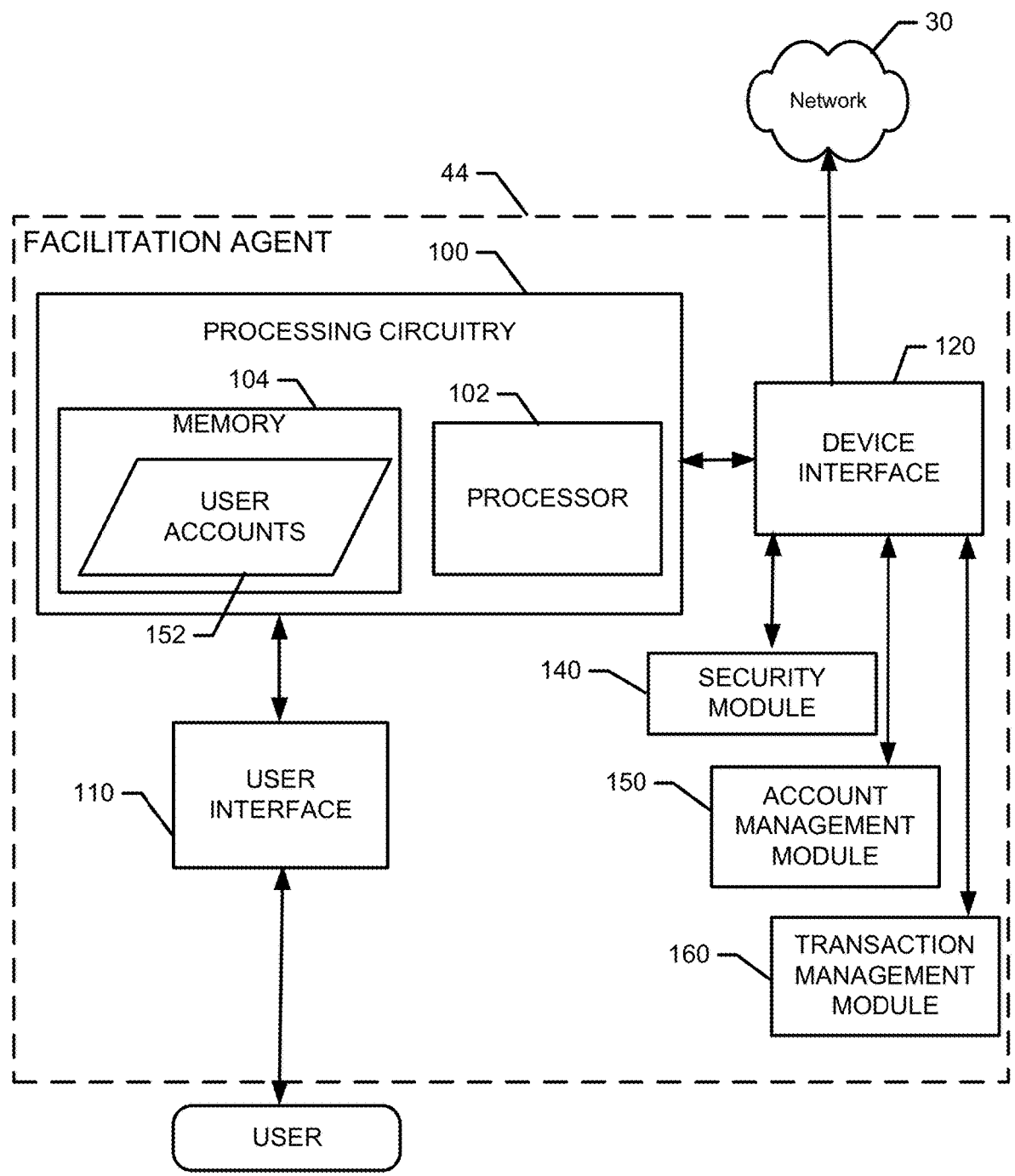
FIG. 2 illustrates a functional block diagram of an apparatus for defining a facilitation agent according to an example embodiment.

FIG. 2 shows certain elements of an apparatus for provision of the facilitation agent 44 or other processing circuitry according to an example embodiment. The apparatus of FIG. 2 may be employed, for example, as the facilitation agent 44 itself operating at, for example, a network device, server, proxy, or the like (e.g., the application server 40 of FIG. 1)). Alternatively, embodiments may be employed on a combination of devices (e.g., in distributed fashion on a device (e.g., a computer) or a variety of other devices/computers that are networked together). Accordingly, some embodiments of the present invention may be embodied wholly at a single device (e.g., the application server 40) or by devices in a client/server relationship (e.g., the application server 40 and one or more clients 20). Thus, although FIG. 2 illustrates the facilitation agent 44 as including the components shown, it should be appreciated that some of the components may be distributed and not centrally located in some cases. Furthermore, it should be noted that the devices or elements described below may not be mandatory and thus some may be omitted or replaced with others in certain embodiments.

Referring now to FIG. 2, an apparatus for provision of tools, services and/or the like for facilitating an exchange for information and services associated therewith in the financial industry is provided. The apparatus may be an embodiment of the facilitation agent 44 or a device of the SFP platform hosting the facilitation agent 44. As such, configuration of the apparatus as described herein may transform the apparatus into the facilitation agent 44. In an example embodiment, the apparatus may include or otherwise be in communication with processing circuitry 100 that is configured to perform data processing, application execution and other processing and management services according to an example embodiment of the present invention. In one embodiment, the processing circuitry 100 may include a storage device (e.g., memory 104) and a processor 102 that may be in communication with or otherwise control a user interface 110 and a device interface 120. As such, the processing circuitry 100 may be embodied as a circuit chip (e.g., an integrated circuit chip) configured (e.g., with hardware, software or a combination of hardware and software) to perform operations described herein. However, in some embodiments, the processing circuitry 100 may be embodied as a portion of a server, computer, laptop, workstation or even one of various mobile computing devices. In situations where the processing circuitry 100 is embodied as a server or at a remotely located computing device, the user interface 110 may be disposed at another device (e.g., at a computer terminal) that may be in communication with the processing circuitry 110 via the device interface 120 and/or a network (e.g., network 30).

The user interface 110 may be in communication with the processing circuitry 100 to receive an indication of a user input at the user interface 110 and/or to provide an audible, visual, mechanical or other output to the user. As such, the user interface 110 may include, for example, a keyboard, a mouse, a joystick, a display, a touch screen, a microphone, a speaker, augmented/virtual reality device, or other input/output mechanisms. In embodiments where the apparatus is embodied at a server or other network entity, the user interface 110 may be limited or even eliminated in some cases. Alternatively, as indicated above, the user interface 110 may be remotely located.

The device interface 120 may include one or more interface mechanisms for enabling communication with other devices and/or networks. In some cases, the device interface 120 may be any means such as a device or circuitry embodied in either hardware, software, or a combination of hardware and software that is configured to receive and/or transmit data from/to a network (e.g., network 30) and/or any other device or module in communication with the processing circuitry 100. In this regard, the device interface 120 may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods. In situations where the device interface 120 communicates with a network, the network 30 may be any of various examples of wireless or wired communication networks such as, for example, data networks like a Local Area Network (LAN), a Metropolitan Area Network (MAN), and/or a Wide Area Network (WAN), such as the Internet, as described above.

In an example embodiment, the memory 104 may include one or more non-transitory storage or memory devices such as, for example, volatile and/or non-volatile memory that may be either fixed or removable. The memory 104 may be configured to store information, data, applications, instructions or the like for enabling the apparatus to carry out various functions in accordance with example embodiments of the present invention. For example, the memory 104 could be configured to buffer input data for processing by the processor 102. Additionally or alternatively, the memory 104 could be configured to store instructions for execution by the processor 102. As yet another alternative, the memory 104 may include one of a plurality of databases (e.g., database server 42) that may store a variety of files, contents or data sets. Among the contents of the memory 104, applications (e.g., a service application configured to interface with the client application 22) may be stored for execution by the processor 102 in order to carry out the functionality associated with each respective application.

The processor 102 may be embodied in a number of different ways. For example, the processor 102 may be embodied as various processing means such as a microprocessor or other processing element, a coprocessor, a controller or various other computing or processing devices including integrated circuits such as, for example, an ASIC (application specific integrated circuit), an FPGA (field programmable gate array), a hardware accelerator, or the like. In an example embodiment, the processor 102 may be configured to execute instructions stored in the memory 104 or otherwise accessible to the processor 102. As such, whether configured by hardware or software methods, or by a combination thereof, the processor 102 may represent an entity (e.g., physically embodied in circuitry) capable of performing operations according to embodiments of the present invention while configured accordingly. Thus, for example, when the processor 102 is embodied as an ASIC, FPGA or the like, the processor 102 may be specifically configured hardware for conducting the operations described herein. Alternatively, as another example, when the processor 102 is embodied as an executor of software instructions, the instructions may specifically configure the processor 102 to perform the operations described herein.

In an example embodiment, the processor 102 (or the processing circuitry 100) may be embodied as, include or otherwise control the facilitation agent 44, which may be any means such as a device or circuitry operating in accordance with software or otherwise embodied in hardware or a combination of hardware and software (e.g., processor 102 operating under software control, the processor 102 embodied as an ASIC or FPGA specifically configured to perform the operations described herein, or a combination thereof) thereby configuring the device or circuitry to perform the corresponding functions of the facilitation agent 44 as described below.

The facilitation agent 44 may be configured to include tools to facilitate the creation of customer or user accounts (and a corresponding user profile), and the coordination of communication and fund transfers to support the operations of the SFP platform 10 as described herein. The tools may be provided in the form of various modules that may be instantiated by configuration of the processing circuitry 100. FIG. 2 illustrates some examples of modules that may be included in the facilitation agent 44 and that may be individually configured to perform one or more of the individual tasks or functions generally attributable to the facilitation agent 44 according to an example embodiment. However, the facilitation agent 44 need not necessarily be modular. In cases where the facilitation agent 44 employs modules, the modules may, for example, be configured to perform the tasks and functions described herein. In some embodiments, the facilitation agent 44 and/or any modules comprising the facilitation agent 44 may be any means such as a device or circuitry operating in accordance with software or otherwise embodied in hardware or a combination of hardware and software (e.g., processor 102 operating under software control, the processor 102 embodied as an ASIC or FPGA specifically configured to perform the operations described herein, or a combination thereof) thereby configuring the device or circuitry to perform the corresponding functions of the facilitation agent 44 and/or any modules thereof, as described herein.

As shown in FIG. 2, the facilitation agent 44 may include a security module 140. The security module 140 may be configured to enforce data security and data/user access control. In some example embodiments, the security module 140 may employ authentication and authorization tools to manage the provision of access to customers or other SFP platform 10 members or entities wishing to access the SFP platform 10. The security module 140 may operate on queries or communications in real time as such queries or communications are occurring.

The facilitation agent 44 may also include an account management module 150. The account management module 150 may be configured to manage storage of and access to information about individual customers including user accounts 152 and corresponding user profiles, which may include descriptive information about settings, approvals, or management paradigms that apply to specific vendors or transactions for each instance of the user accounts 152. The user accounts 152 may include details of the checking or savings account at the customer bank for each customer and respective client 20, and authorizations to check account status for each.

In an example embodiment, the account management module 150 may handle communications with the clients 20 associated with setting up the user accounts 152. The user profile associated with each respective one of the user accounts 152 may include user preferences, entitlements, or authorizations (e.g., credit limits) with respect to the amount of debt each user is enabled to take on either in aggregate, on a transaction by transaction basis, on a vendor basis, or with respect to specific types of goods or services. Each transaction may, for example, be authorized only if rules associated with either user preferences or policies that the customer has reviewed and accepted as terms of service are met. Those rules may be established during account setup and recorded for each of the user accounts 152 by the account management module 150.

In an example embodiment, the facilitation agent 44 may also include a transaction management module 160. The transaction management module 160 may coordinate or facilitate all communications with the parties to the SFP platform 10 in association with each transaction that is initiated by a customer. As such, the transaction management module 160 may be configured to receive an indication of a pending transaction and, within a predetermined period of time (e.g., 3 seconds) make a determination as to whether to authorize the transaction or deny the transaction. The decision to authorize or deny the transaction may be made based on either a real time and concurrent check on the account status (e.g., account balance) of the checking or savings account identified in the user account 152, or based on the last snapshot of the account status (assuming the snapshot was taken within a predetermined period of time (e.g., 3 days or less). If the account status is satisfactory, the transaction may be authorized, and further communications and coordination details described below may be handled by the transaction management module 160. The transaction management module 160 may also be configured to, assuming certain criteria are met, provide the customer with options for either immediate settlement relative to the transaction, or whether to convert the transaction to a buy now, pay later loan with predetermined (or customer selected) payment terms. The transaction management module 160 may therefore handle communications with the client 20, the vendor agent 60, the customer bank agent 70, the bank authentication agent 50, the issuing bank agent 55, and the payment processor 80 as described in greater detail below in response to and after handling a transaction.

FIG. 3 illustrates a block diagram of a communication paradigm that is achievable using an example embodiment for setting up a user account. Referring to FIG. 3, a client (e.g., one of the clients 20 of FIG. 1) may make an account application at operation 200. The account application may be submitted to the facilitation agent 44 via the client application 22 and interface with a website or smart phone application for account setup. The account application may include an identification of the customer (or user) and information establishing a confirmation of employment or monthly income for the customer. The account application may also or alternatively provide account details for the savings account and/or checking account that will serve as the primary account from which funds for settling transactions are extracted. The account application may also include permissions, acknowledgements and any other required communications to authorize setup of the user account 152. At operation 210, the facilitation agent 44 may process the account application and setup the user account incorporating a user profile for the user account. As noted above, the user account may include identifying information for the checking or savings account of the customer. Thereafter, at operation 220, the facilitation agent 44 may routinely or periodically check the checking or savings account to determine account status and retains such information for transaction processing as described herein. Periodic checks may occur with a selected periodicity and each check may return a snapshot view of the account status at the corresponding time. Routine checks may be initiated responsive to specific activities such as initiation of a transaction. As noted above, the account management module 150 may handle the processes of the facilitation agent 44 that are covered by the example of FIG. 3.

FIG. 4 is a block diagram of control flow associated with a customer executing a transaction at the point of sale (or online). As shown in FIG. 2, the initial operation of the customer attempting to initiate a transaction with a vendor may occur at operation 300. The customer may physically present the card (e.g., similar to presentation of a debit card), use a digital card, or may provide card number information if the card is not physically present. Thereafter, the facilitation agent 44 may conduct a status check (e.g., check the account status in real time or based on the last snapshot view) to determine whether to approve or deny the transaction within a predetermined period of time (e.g., about 3 seconds) at operation 310. If the status check passes (e.g., indicating that the checking or savings account has a balance sufficient to cover the transaction), the facilitation agent 44 may approve the transaction and the vendor may receive an indication that the transaction has been approved at operation 320. The vendor may put an authorized hold on funds associated with the amount of the transaction at the authenticating bank. The customer may also receive (e.g., via the client application 22) a push message to indicate that the transaction was approved at operation 330.

If instead, the status check does not pass (e.g., indicating that the checking or savings account does not have a balance sufficient to cover the transaction), then the facilitation agent 44 may deny the transaction and the vendor may receive an indication that the transaction has been denied at operation 340. The customer may also receive (e.g., via the client application 22) a push message to indicate that the transaction was denied at operation 350.

FIG. 5 is a block diagram of control flow associated with intermediate handling of a transaction. In this regard, for some time period after the transaction (e.g., a deferment period), the customer may elect (either proactively or responsive to a prompt from the facilitation agent 44) how to settle the transaction. Otherwise, if no election is made by the expiration of the deferment period, a default election may be assumed. Thus, for example, the customer may (at any time before the expiration of the deferment period (e.g., 48 hours)) utilize the client application 22 to access services of the facilitation agent 44 (e.g., by logging in with appropriate credentials). The customer may recall the transaction (or multiple transactions conducted with the card and associated with the user account 152) via the client application 22 and review details of the transaction (e.g., date, location, vendor, amount, etc.). As an alternative to a customer-initiated recall of the transaction for review, the customer may receive a push message from the facilitation agent 44 requesting the customer to review the transaction (or recent transactions within a given period of time less than the deferment period). Decisions may then be made regarding how to settle the transaction.

In this regard, as shown in FIG. 5, an initial inquiry as to whether the deferment period has expired or elapsed may be conducted at operation 400. If the deferment period has not expired, a determination may be made at operation 410 as to whether customer review of a transaction has been initiated. If not, the process may cycle back to operation 400 until either the deferment period expires or customer review is initiated (either by the customer or by the facilitation agent 44). Whether customer initiated or prompted by the facilitation agent 44, operation 410 may include customer review of a recent transaction (or of recent transactions) that has occurred within the deferment period. If the deferment period is 48 hours, the initiation of customer review at operation 410 may be prompted at 24 hours. However, the customer may initiate such review at any time during the deferment period.

The customer may then be provided (i.e., by the facilitation agent 44) with an option to treat the transaction as a debit transaction or convert the transaction to a buy now, pay later transaction at operation 420. In other words, operation 420 may include providing the customer with settlement options for the transaction. The settlement options in this case may include either treating the transaction as a debit transaction (and therefore settling the transaction immediately) or treating the transaction as a buy now, pay later transaction. The selection by the customer is received at operation 430. If treated as a debit transaction, the customer has elected to settle the transaction immediately. A determination is then made at operation 440 as to whether the customer's checking or savings account at the customer bank has sufficient funds to cover the transaction. If sufficient funds are present, then a transition of funds may be initiated (e.g., with assistance from the payment processor 80) from the customer bank to the issuing bank at operation 450. Funds may thereafter be transitioned at operation 460 from the issuing bank to the vendor settling the transaction and removing the authorized hold that the vendor had placed when the transaction was initially conducted. In some embodiments, the facilitation agent 44 may be configured to bundle all transactions that are to be settled for a given customer (or for a given customer bank if multiple customers happen to use the same customer bank) prior to transitioning funds from the customer bank at operation 450 in order to reduce the overall number of individual transitioning of funds events.

If, however, there are insufficient funds in the customer's checking or savings account at the customer bank at operation 440, then a transition of funds may instead be provided from an account associated with the facilitation agent 44 to the issuing bank at operation 470. The issuing bank may also transition funds to the vendor at operation 480 to remove the authorized hold that the vendor had placed when the transaction was initially conducted, and satisfy the vendor's interest in the transaction. However, in order to cover the transaction's cost, the amount owed may be converted to a buy now, pay later transaction between the facilitation agent 44 and the customer. Thus, for example, at operation 490, the facilitation agent 44 may extend buy now, pay later terms to the customer. The terms may indicate a number and periodicity for payments to be withdrawn from the customer's checking or savings account at the customer bank to be paid to the facilitation agent 44. Although not required, in some cases, the customer may be offered and may make an election as to the time period for payments to be made (e.g., 2 weeks, 4 weeks, 6 weeks, etc.) Thereafter, the facilitation agent 44 may receive funds from the customer bank according to the buy now, pay later terms at operation 495 until the transaction is settled upon the last payment being made.

Meanwhile, if the customer made the election at operation 430 to defer the settlement of the transaction, flow may pass to operation 470 and continue on the buy now, pay later option (albeit voluntarily instead of by necessity). In some cases, the extension of terms that provide an option to the customer to select the payback period may only be provided if the deferment option is selected at operation 430. As such, for example, if insufficient funds are available, and the transaction converts to buy now, pay later by necessity instead of by election, the terms may be dictated by the facilitation agent 44, and in some cases may be derived based on the credit score of the customer, the payment history of the customer, or a combination thereof.

In some embodiments, only transactions of a certain minimum amount (e.g., $100) may be eligible for election to be deferred to a buy now, pay later transaction. However, in some cases, the customer may be enabled to group (e.g., accumulate and combine) a number of smaller transactions to defer payment on the group, and to treat the entire group as a buy now, pay later transaction. The user profile may dictate these options in some cases, or may define limits, minimums or other factors that the facilitation agent 44 may use to determine the terms to offer at operation 490. The limits may include a limit to the amount of buy now, pay later financing that is available to the customer (i.e., how much outstanding loan balance the customer can carry). In an example embodiment, the client application 22 may be used by the customer to review the status of buy now, pay later transactions that are in existence between the customer and the facilitation agent 44.

Figure 6:
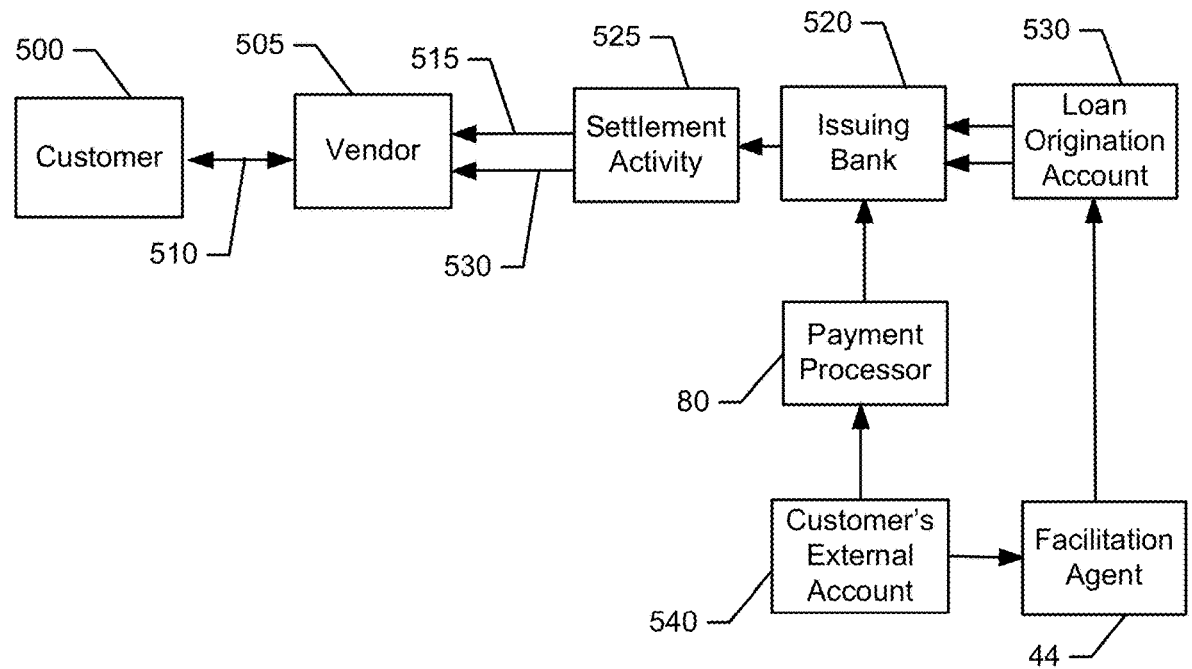
FIG. 6 is a block diagram showing how funds flow between parties in accordance with an example embodiment.

FIG. 6 is a block diagram of control flow associated with flow of funds in accordance with an example embodiment. As shown in FIG. 6, a customer 500 and a vendor 505 may engage in a transaction 510. The day on which the transaction occurs may be considered to be day 0 in the timeline of events associated with the transaction 510. Also on day 0, and as an immediate result of the transaction being approved via the processes described above, an authorization 515 for funds to be transferred to the vendor 505 may be issued by the issuing bank 520 as part of settlement activity 525. The issuing bank 520 may also conduct a settlement transfer 530 between day 0 and day 3 after the transaction 510 as part of the settlement activity 525.

A facilitator loan origination account 530 may exist and deposits may be provided from the facilitator loan origination account 530 to the issuing bank 520 prior to any debit transactions (i.e., prior to day 0) to ensure that debit transactions are not declined and that settlement may occur (i.e., that funds are available at the issuing bank 520) within a period of time of about two days. Money may also transfer (e.g., about at day 2) for any cases where a buy now, pay later loan is made using the processes described above. The customer's external account 540 (i.e., at the customer bank) may also be available to transfer funds via the payment processor 80 to the issuing bank 520. In this regard, on about day 2, settlement funds 545 may be transferred from the customer's external account 540 to the issuing bank 520 via the payment processor 80 under direction of the facilitation agent 44. In some cases, payments 550 may also be made (e.g., at the payment intervals determined by the terms) to the facilitation agent 44. The facilitation agent 44 may also make transfers to the facilitator loan origination account 530. Thus, all fund transfers to the issuing bank 520 may be conducted under control of the facilitation agent 44.

Figure 7:
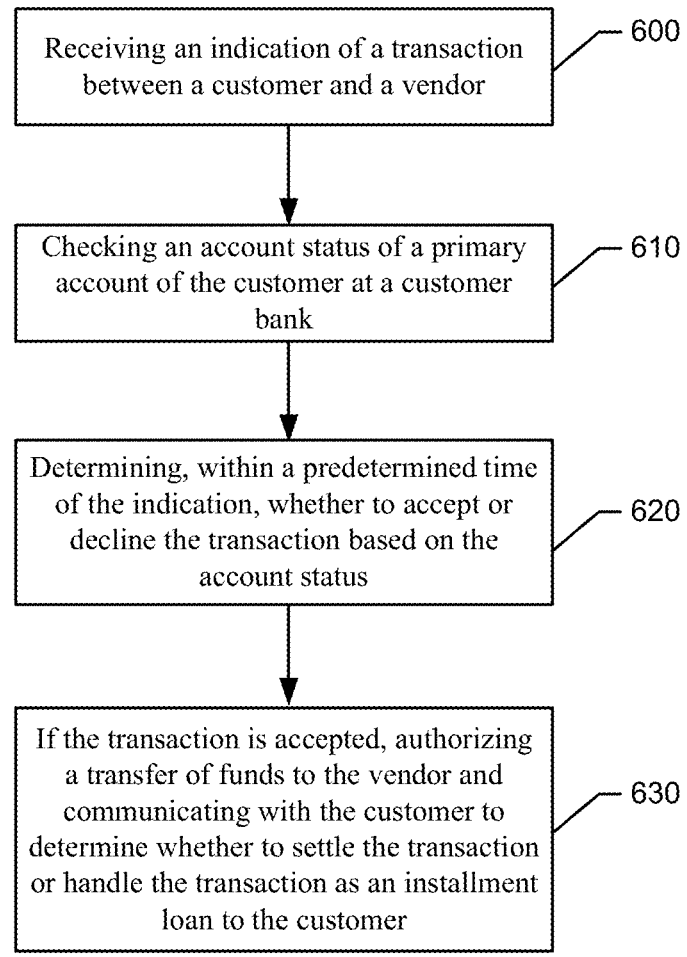
FIG. 7 illustrates a method for managing a customer transaction in accordance with an example embodiment.

From a technical perspective, the SFP platform 10, and more particularly the facilitation agent 44, described above may be used to support some or all of the operations described above. As such, the apparatus described in FIG. 2 may be used to facilitate the implementation of several computer program and/or network communication based interactions. As an example, FIG. 7 is a flowchart of a method and program product according to an example embodiment of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a user terminal (e.g., client 20, application server 40, and/or the like) and executed by a processor in the user terminal. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method of processing a customer transaction according to one embodiment of the invention is shown in FIG. 7. The method may include receiving an indication of a transaction between a customer and a vendor at operation 600, and checking an account status of a primary account of the customer at a customer bank at operation 610. The method may further include determining, within a predetermined time of the indication, whether to accept or decline the transaction based on the account status at operation 620. The method may further include, if the transaction is accepted, authorizing a transfer of funds to the vendor and communicating with the customer to determine whether to settle the transaction or handle the transaction as an installment loan to the customer at operation 630.

In an example embodiment, an apparatus for performing the method of FIG. 7 above may comprise a processor (e.g., the processor 102) or processing circuitry configured to perform some or each of the operations (600-630) described above. The processor may, for example, be configured to perform the operations (600-630) by performing hardware implemented logical functions, executing stored instructions, or executing algorithms for performing each of the operations. In some embodiments, the processor or processing circuitry may be further configured for additional operations or optional modifications to operations 600 to 630.

In some embodiments, the method (and a corresponding apparatus or system configured to perform the operations of the method) may include (or be configured to perform) additional components/modules, optional operations, and/or the components/operations described above may be modified or augmented. Some examples of modifications, optional operations and augmentations are described below. It should be appreciated that the modifications, optional operations and augmentations may each be added alone, or they may be added cumulatively in any desirable combination. In this regard, for example, checking the account status of the primary account may include checking an account balance of a checking account or savings account of the customer at the customer bank. In an example embodiment, determining whether to accept or decline the transaction may include accepting the transaction if the account balance is greater than an amount of the transaction, and declining the transaction if the account balance is less than the amount of the transaction. In some cases, the predetermined time may be about 3 seconds. In an example embodiment, communicating with the customer may include initiating contact with the customer in advance of expiration of a deferment period. In some cases, communicating with the customer may include offering one or more selectable payment period options over which the customer makes payments toward the transaction to service the installment loan. In an example embodiment, communicating with the customer may include receiving messages initiated by the customer in advance of expiration of a deferment period. In some cases, communicating with the customer may include receiving direction from the customer to settle the transaction immediately. In such an example, responsive to the direction, a payment service may be engaged to transfer funds from the primary account to an issuing bank that transferred funds to the vendor. In an example embodiment, if communicating with the customer does not result in receipt of an instruction to settle the transaction or handle the transaction as the installment loan within a deferment period, then the transaction is handled as the installment loan. In some cases, a plurality of transactions may be bundled for the customer prior to settlement of the transactions with the customer bank.

The ability to defer decisions as to how to settle transactions that is described above may apply to either a physical card that is associated with the user account (e.g., a debit card, credit card, or other physical payment facilitating card), or to a virtual card that is associated with the user account. In some cases, the physical payment facilitating card may be a functionally dynamic card that can be configured to change its function via over-the-air communication. The functional changes that can be performed in association with the functionally dynamic card may vary from being instantiated before, during or after a transaction, as discussed in greater detail below. Moreover, in some cases, all such functional changes may only occur in relation to backend processing after the functionally dynamic card has been used, again based on over-the-air communication. Thus, although configuration for such functional changes may be accomplished before or during a transaction, the implementation or actions affected by those changes may occur responsive to use of the functionally dynamic card as a payment vehicle for a transaction.

Figure 8:
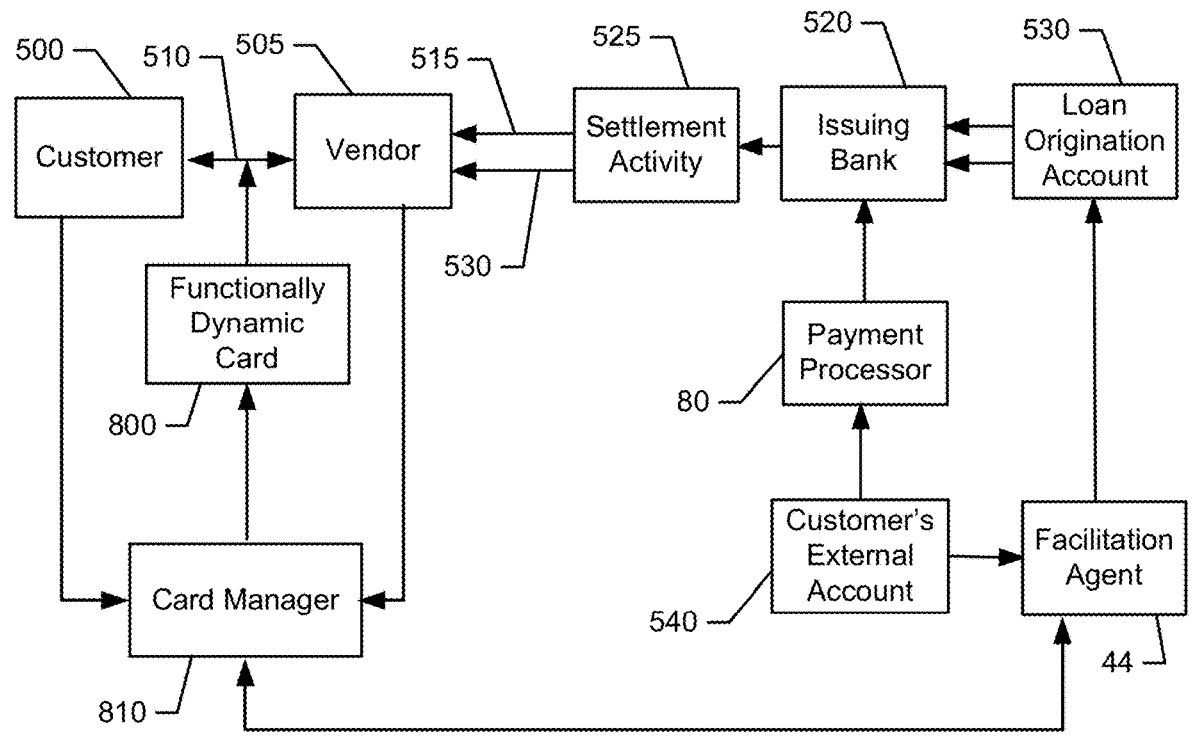
FIG. 8 illustrates a system in which a functionally dynamic card may be issued and used to conduct transactions in accordance with an example embodiment.

FIG. 8 is a block diagram showing integration of a functionally dynamic card 800 into the control flow diagram of FIG. 6 in accordance with an example embodiment. As shown in FIG. 8, the customer 500 and the vendor 505 may engage in the transaction 510, which may be conducted using the functionally dynamic card 800. Interactions described above relating to the settlement activity 525 may be largely conducted in the same way described above in reference to FIG. 6. However, the facilitation agent 44 may treat the transaction 510 and process the transaction 510 based on customer 500 interaction with an card manager 810 as described in greater detail herein.

As shown in FIG. 8, the card manager 810 may be operably coupled to the customer 500, the vendor 505 and the facilitation agent 44 (e.g., via network 30 of FIG. 1). Thus, for example, the card manager 810 may be a device or entity that sits between the customer 500 and the facilitation agent 44 (and in some cases also the vendor 505). However, the card manager 810 may alternatively be instantiated at one or both of the customer 500 and the facilitation agent 44. In some cases, the card manager 810 may host or be embodied as an application that is downloadable to the client 20 (e.g., smartphone) of the customer 500, or may be a web application (e.g., stored at the application server 42) with which the customer 500 may interface via wireless communication using a smartphone, tablet, computer or other communication device of the customer 500.

The customer 500 (and in some cases also the vendor 505 and other parties) may be enabled to interact with the card manager 810 and/or facilitation agent 44 via over-the-air signaling (e.g., wireless communication) to implement functional changes to the operability of the functionally dynamic card 800. Thus, not only may updated instructions regarding a selected modality of the functionally dynamic card 800 be accomplished wirelessly, but the application itself may be updated, and other software updates or improved/additional functions may be pushed out to customers wirelessly. In some cases, modality processing options providing a deeper level of functional performance within selected (and non-selected) modalities may be communicated in this way also. In some embodiments, the modality processing options may include promotions that can be toggled on or off, and may be encountered passively by customers when interacting with the card manager 810. However, in other cases, merchants or vendors and other parties may actively push promotions, messages or offers to customers. These push messages may be targeted based on modality or, in some cases, based on geographic location (e.g., proximity) of the customer to a particular location or product. For example, customers meeting certain criteria and within 10 miles of a given location may receive a push message providing modality processing options or other promotions.

In an example embodiment, the functionally dynamic card 800 may be structured (e.g., including magnetic stripe, chip, etc.) as a typical credit or debit card. The card number may therefore include a prefix associated with the type of card (e.g., credit, debit, or other payment card) that the functionally dynamic card 800 is designed to emulate, along with account information identifying the user account of the customer 500. Accordingly, transactions with the vendor 505 (i.e., transaction 510) may occur as though the functionally dynamic card 800 is the corresponding type of card being emulated. However, as between the customer 500 and the facilitation agent 44, the backend processing of the transaction 510 may be changed based on the inputs or instructions that the customer 500 defines for the functionally dynamic card 800 via the card manager 810.

Figure 9:
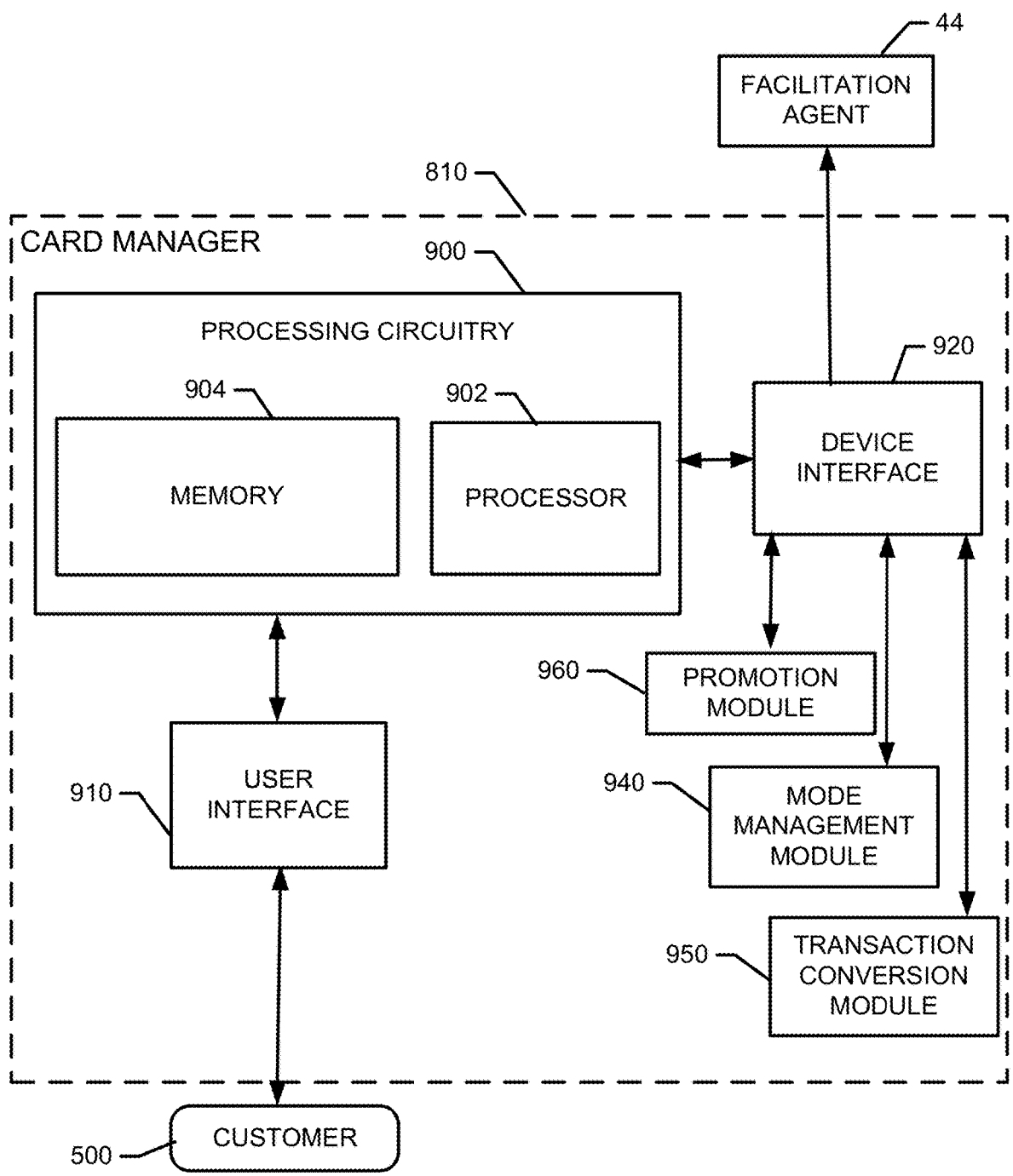
FIG. 9 is a block diagram of a card manager for managing the functionally dynamic card in accordance with an example embodiment.

FIG. 9 illustrates a block diagram of the card manager 810 of an example embodiment. The card manager 810 may be instantiated via processing circuitry 900 comprising a processor 902 and memory 904 that may be similar in function (and perhaps also form) to the processing circuitry 100, processor 102 and memory 104 described above. The card manager 810 may also include a user interface 910 and device interface 920 that may be similar in function (and perhaps also form) to the user interface 110 and device interface 120 described above. Thus, a repeat of the structures of such components will not be repeated here.

As shown in FIG. 9, the card manager 810 may also include various modules that may be dedicated or distributed in nature, and which may be configured to perform corresponding functions described herein. In this regard, for example, the card manager 810 may include a mode management module 940, a transaction conversion module 950, and a promotion module 960. Each of the mode management module 940, the transaction conversion module 950 and the promotion module 960 may be any means such as a device or circuitry operating in accordance with software or otherwise embodied in hardware or a combination of hardware and software (e.g., processor 902 operating under software control, the processor 902 embodied as an ASIC or FPGA specifically configured to perform the operations described herein, or a combination thereof) thereby configuring the device or circuitry to perform the corresponding functions of the mode management module 940, the transaction conversion module 950 and the promotion module 960, respectively, as described below.

Figure 10A:
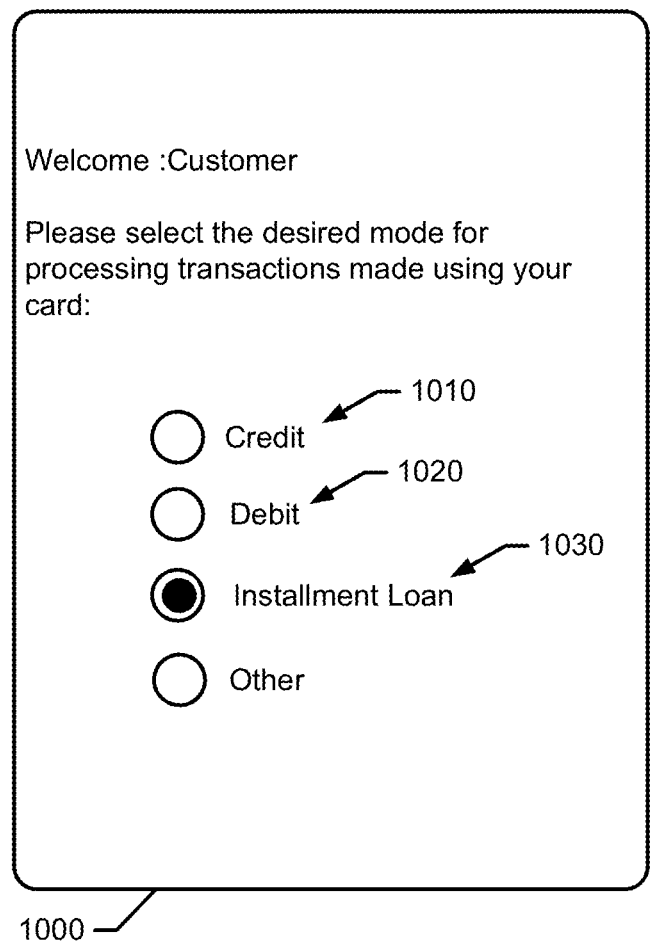
FIG. 10A is an example control console or application interface that may be used to select a modality for operation of the functionally dynamic card in accordance with an example embodiment.

The mode management module 940 may be used by the customer 500 to alter a modality of the functionally dynamic card 800 when used to process the transaction 510. In this regard, no matter what type of card the functionally dynamic card 800 is structured to emulate (e.g., debit card, credit card, or other payment card), the modality applied by the facilitating agent 44 may be determined via instructions recorded by the customer via the mode management module 940. In an example embodiment, the mode management module 940 may provide a mode selection interface to the customer 500 that enables mode selections to be made. For example, the mode selection interface may define drop down selectable items, selectable icons, radio buttons for mode selection, or any other selection means to enable the customer 500 to select a modality for processing the transaction 510. FIG. 10A below shows an example of a mode selection interface.

The transaction conversion module 950 may be configured to track all transactions that are not fully settled and that are eligible for conversion to a different type of transaction (e.g., transactions in the deferment period). The transaction conversion module 950 may further enable conversion of the tracked transactions to alternative types of transactions calculating and presenting terms for such conversions and providing all necessary terms, conditions, and legal notices to the customer 500 for acceptance prior to affecting such conversion. The transaction conversion module 950 may coordinate with the security module 140, the account management module 150, and the transaction management module 160 of FIG. 2 in order to instantiate loans, process credit card or other payments or otherwise affect changes to the status of a transaction. Although transactions in the deferment period may easily be handled in total by the transaction conversion module 950, it may also be possible to change transactions that are partially paid off or in the process of being paid off to other types of transactions in some cases. For example, a credit card transaction with interest accrued and one or two payments made may be converted to an installment loan via the transaction conversion module 950 and interaction with the facilitation agent 44 as described above.

The promotion module 960 may be a module used primarily for vendors (e.g., vendor 505 and others) banks, product suppliers/manufacturers, the entity associated with the facilitation agent 44 and any other third parties with an interest in interacting with the customers 500 to support operation of the SFP platform 10, to provide promotional incentives to customers. The promotional incentives may include increased credit limits, reduced interest rates (including zero interest promotions), price reductions on specific items, item brands, types of items, etc., or the like. Thus, for example, some vendors, suppliers, etc., may define product-specific, merchant-specific, or other terms that are specific to a party willing to cooperate with the entity operating the facilitation agent 44 to offer incentives to customers to initiate transactions. Thus, the promotion module 960 provides a mechanism by which merchants and other parties may participate in facilitating lending transactions that incent customers to purchase goods and services and thereby drive sales. In some embodiments, the promotion module 960 may be used to manage a reward program where points or credits may be issued to customers based on purchases associated with specific products or services offered by merchants, suppliers, etc. The reward program may facilitate further purchasing power for the customer 500, which may be used instead of, or in combination with, purchases via credit, debit, installment loan, etc.

Although other possibilities may exist, FIG. 10A shows one example of a mode selection interface 1000 in accordance with an example embodiment. As shown in FIG. 10A, the customer 500 may select a modality for operation of the functionally dynamic card 800. Options for modalities may include a credit card modality 1010, a debit modality 1020 and an installment loan modality 1030. Other modalities are also possible. If the credit card modality 1010 is selected, regardless of the physical setup of the functionally dynamic card 800, which determines what type of payment vehicle the card emulates, the transaction 510 will be processed as a credit transaction, so that the vendor 505 is paid accordingly and the user account of the customer 500 may advance funds for the customer 500 and a credit transaction may be processed for the user account of the customer 500 (e.g., with payments and interest according to the credit card terms and conditions agreed upon in advance). If the debit card modality 1020 is selected, again regardless of the physical setup of the functionally dynamic card 800, the transaction 510 will be processed as a debit transaction and funds will be extracted from a checking account (e.g., customer's external account 540) to pay the vendor 505. Meanwhile, if the installment loan modality 1030 is selected, again regardless of the physical setup of the functionally dynamic card 800, the transaction 510 will be processed as an installment loan and funds will be transferred to the vendor 505 and a loan originated as described above in reference to FIG. 6. When initially issued, the functionally dynamic card 800 may have a default modality, which could be any one of the possible modalities. The modality may be changed before a transaction or after a transaction as long as the transaction has not been settled, or a predefined delay period after the transaction has expired.

Figure 10B:
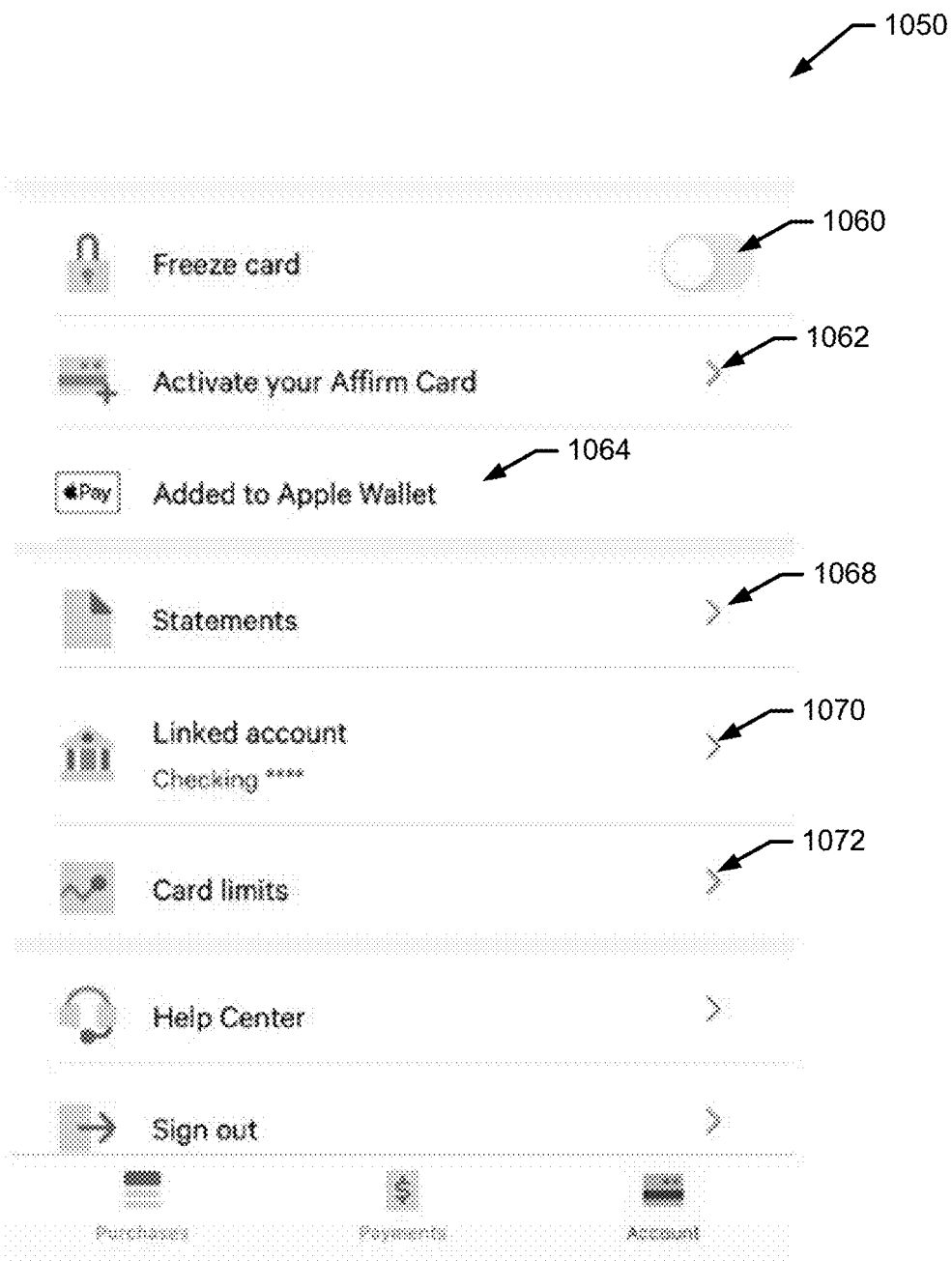
FIG. 10B is an example control console or application interface for managing account functions in accordance with an example embodiment.

FIG. 10B is an example control console or application interface 1050 for managing account functions in accordance with an example embodiment. The functions manageable via the application interface 1050 may vary in different embodiments. However, in the depicted example, a card freeze option 1060 may be provided to enable freezing the card with a single and simple toggle selection. If frozen, the functionally dynamic card 800 may be inactivated for any online or physical purchases. In some cases, a card activation option 1062 may also be provided to enable the card to be activated after acquisition. In some cases, activation may also be accompanied with the modality selection shown in FIG. 10A. A wallet status 1064 may be indicated to show whether or not the card has been added to a wallet application or similar function. In some cases, specific statements 1068 may be reviewed via the application interface 1050. Access to a linked account 1070 may also be provided. In some cases, a link to specific card limits 1072 associated with each respective modality may also be provided. Other functions may also be provided in some cases.

Figure 11A:
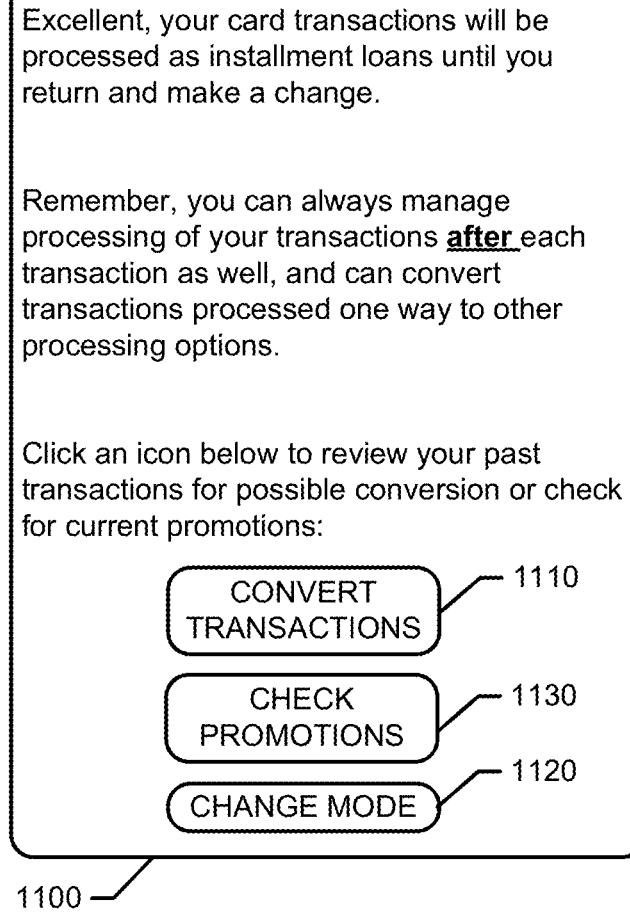
FIG. 11A is an acknowledgement message confirming the current modality of the functionally dynamic card and providing options for conversion and merchant integration in accordance with an example embodiment.
Figure 11B:
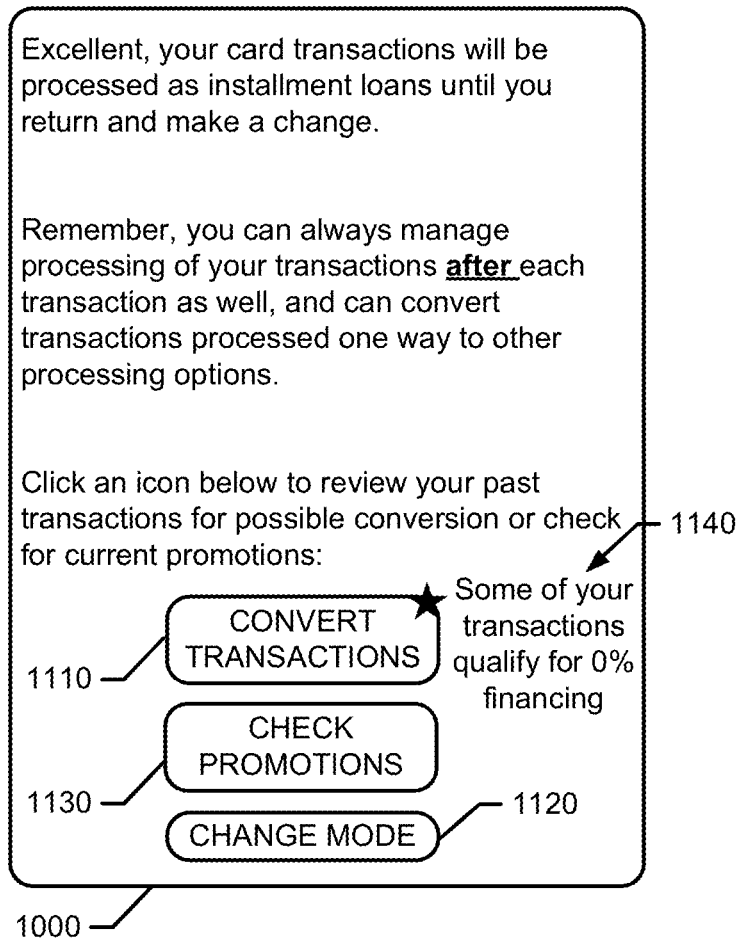
FIG. 11B is another example of the acknowledgement message including a push message providing a promotional link in accordance with an example embodiment.

FIG. 11A shows an example acknowledgement message 1100, which may be issued to the customer 500 to confirm the current modality of the functionally dynamic card 800. In the example of FIG. 11A, the current modality of the functionally dynamic card 800 is confirmed as processing card transactions as installment loans based on the selection made in the example of FIG. 10A. However, the acknowledgement message 1100 further reminds the customer 500 that conversion of past transactions is also possible. Moreover, a conversion link 1110 is provided to enable the customer 500 to review past transactions that may be convertible via the transaction conversion module 950. A mode change link 1120 may also be provided to enable the customer to return to the mode selection interface 1000 of FIG. 10A to select or change the current modality of the mode selection interface 1000. Finally, a promotions link 1130 may be provided to access the promotion module 960 to review available promotions that may be provided by vendors or other third party participants that may, for example, be in communication with clients 20 via the network 30. However, the promotion module 960 may also or alternatively push notifications to the customer 500 for promotions in some cases. FIG. 11B illustrates such an example.

Referring to FIG. 11B, the acknowledgement message 1100 of 11A is shown except that a promotion notification 1140 is provided to indicate that one of the parties involved in the system shown in FIG. 9 is providing a promotion for 0% financing that is applicable to one of the transactions the customer 500 has previously conducted. Thus, the promotion notification 1140 may be pushed to the customer 500 to incent the customer 500 to explore the option to convert transactions. The promotion notification 1140 may also appear on other screens and in other contexts associated with the interface the customer 500 has with the card manager 810 and/or the facilitation agent 44.

Figure 12:
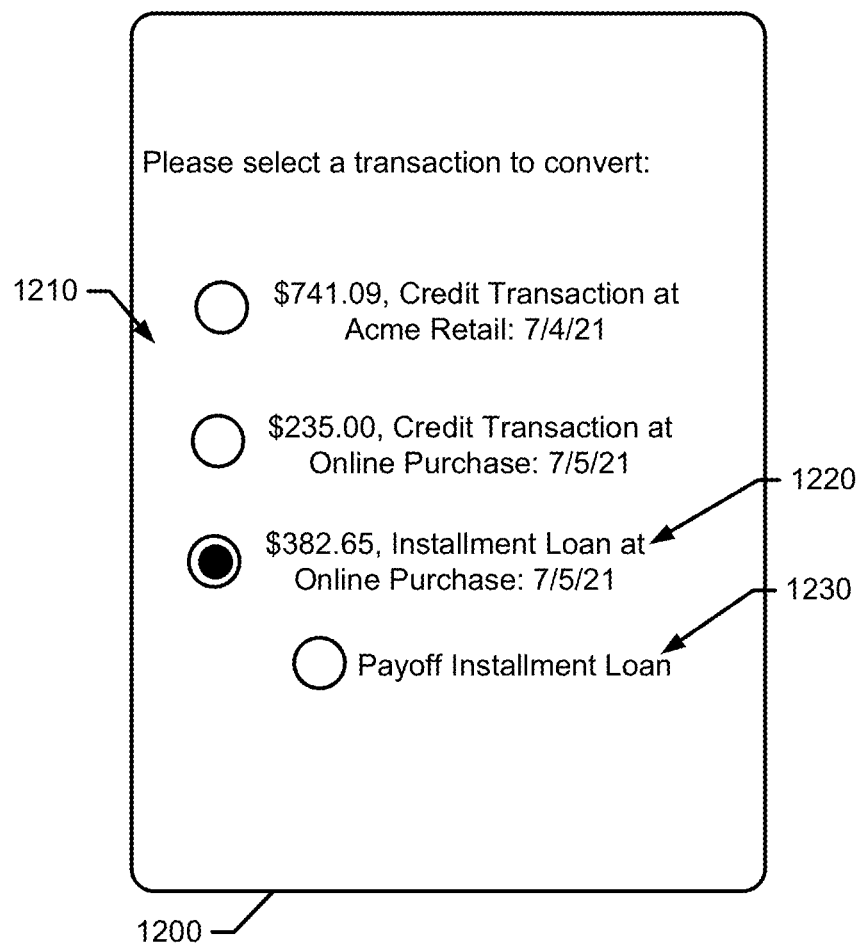
FIG. 12 shows a conversion page in which an installment loan transaction may be converted in accordance with an example embodiment.

In an example embodiment, selection of the conversion link 1110 may take the customer 500 to a conversion page 1200 shown in FIG. 12. The conversion page 1200 may have a list of transactions 1210 that are convertible. The convertible transactions may be defined by a price value, a transaction type, date and any other useful identifying information. In the example of FIG. 12, the customer 500 has selected an installment loan purchase 1220 for consideration of conversion. Conversion options may then be presented that are specific to the type classification of the transaction selected. In this example, the installment loan purchase 1220 is of a type that has conversion options associated therewith that include a payoff option 1230. In some embodiments, custom loan options may also exist to enable the customer 500 to define and/or explore loan options for conversion including payment amounts, term, interest rates, etc.

Figure 13A:
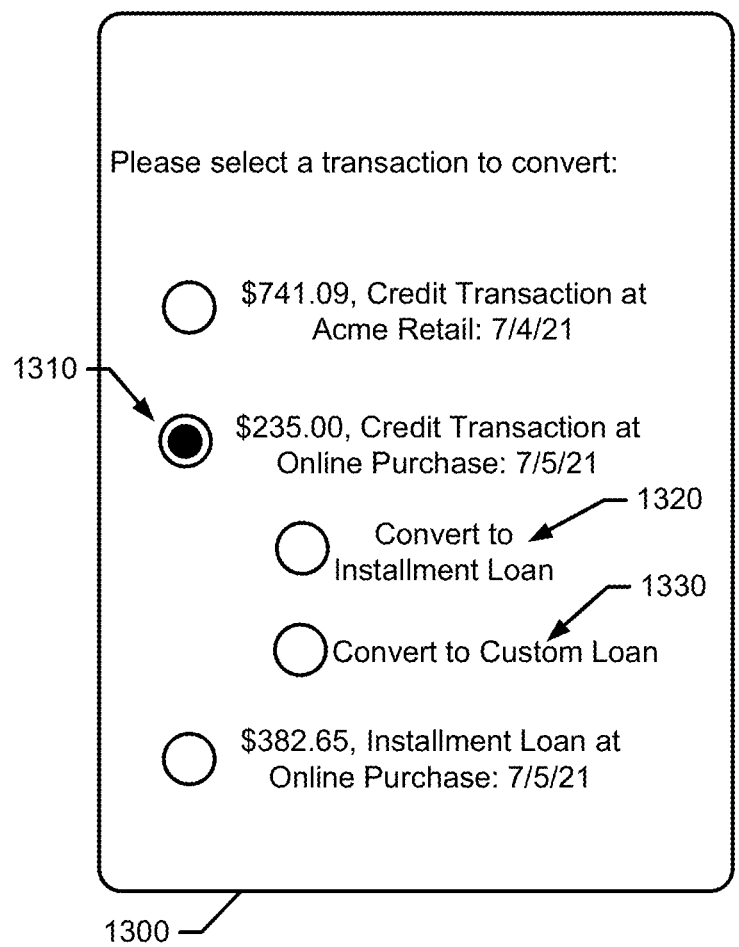
FIG. 13A shows an alternative conversion page in which a credit transaction has been selected for possible conversion in accordance with an example embodiment.
Figure 13B:
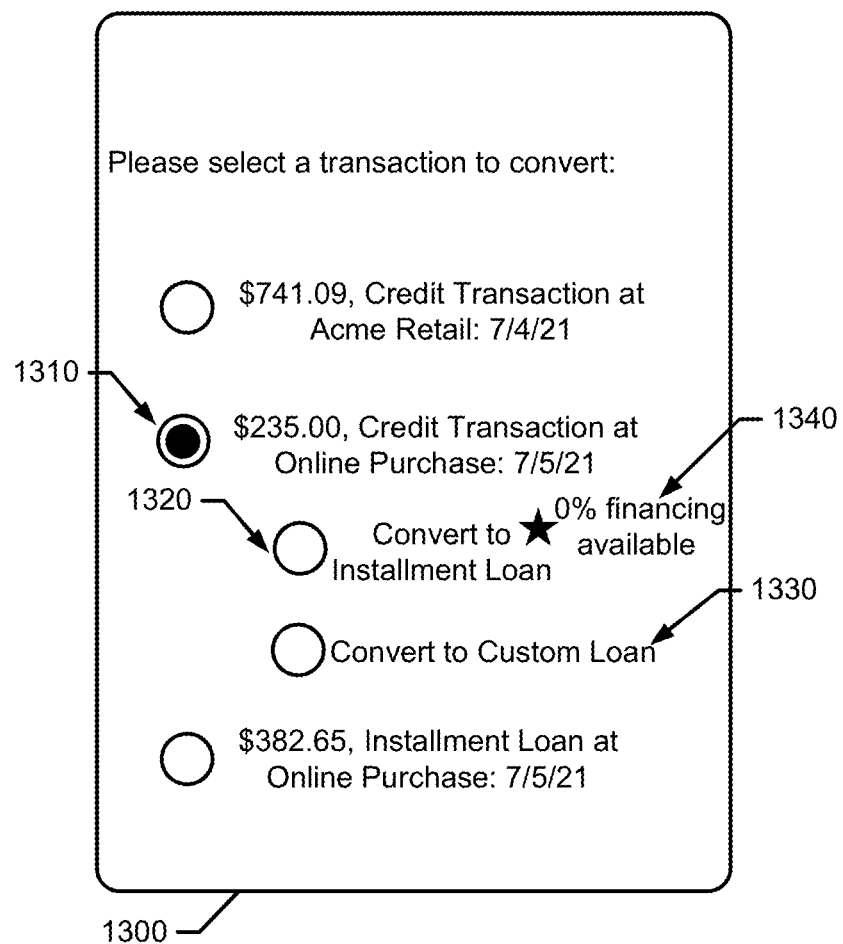
FIG. 13B shows the conversion page of FIG. 13A with a pushed promotional link provided thereon in accordance with an example embodiment.

FIG. 13A shows an alternative conversion page 1300 in which a credit transaction 1310 has been selected for possible conversion. Conversion options, which are based on the type classification of the transaction being "credit," include a first conversion option 1320 for converting the credit transaction to an installment loan and a second conversion option 1330 for converting the credit purchase to a custom loan (which as noted above, may include selectable values for payment amount, length of repayment term, interest rate, etc.). Similar to the example above, a push notification (e.g., promotion link 1340) may be provided, as shown in FIG. 13B, to notify the customer 500 of a specific incentive or promotion that is available for employment with respect to converting the transaction in a particular way. In this example, the promotion link 1340 indicates that 0% financing is available for conversion of the credit transaction 1310 into an installment loan. The product associated with the credit transaction 1310 may, for example, be subject to a promotion offered by the manufacturer or vendor of the product aimed at driving product sales. Alternatively, the entity associated with the card manager 810 and/or the facilitation agent 44 may be offering the incentive to drive lending activity.

As can be appreciated from FIGS. 9-13B above, the card manager 810 may enable the customer to obtain an set a modality for usage of the functionally dynamic card 800. The transactions initiated with the functionally dynamic card 800 will then be processed according to the selected modality. The card manager 810 may also enable further changes or selections to be made at deeper levels within each modality (or the selected modality). Thus, not only is the modality itself selectable, but options within the selected modality are further selectable or customizable by the customer. The customer can also, when such options are available, make processing changes for previously conducted transactions so that, for example, a transaction processed by one modality at the time of purchase may be handled or settled later on via a different user selectable modality through a process of conversion. Moreover, as noted above, the merchants, banks or suppliers may also be integrated into the system to provide incentives that impact each respective modality and conversions between modalities.

Figure 14:
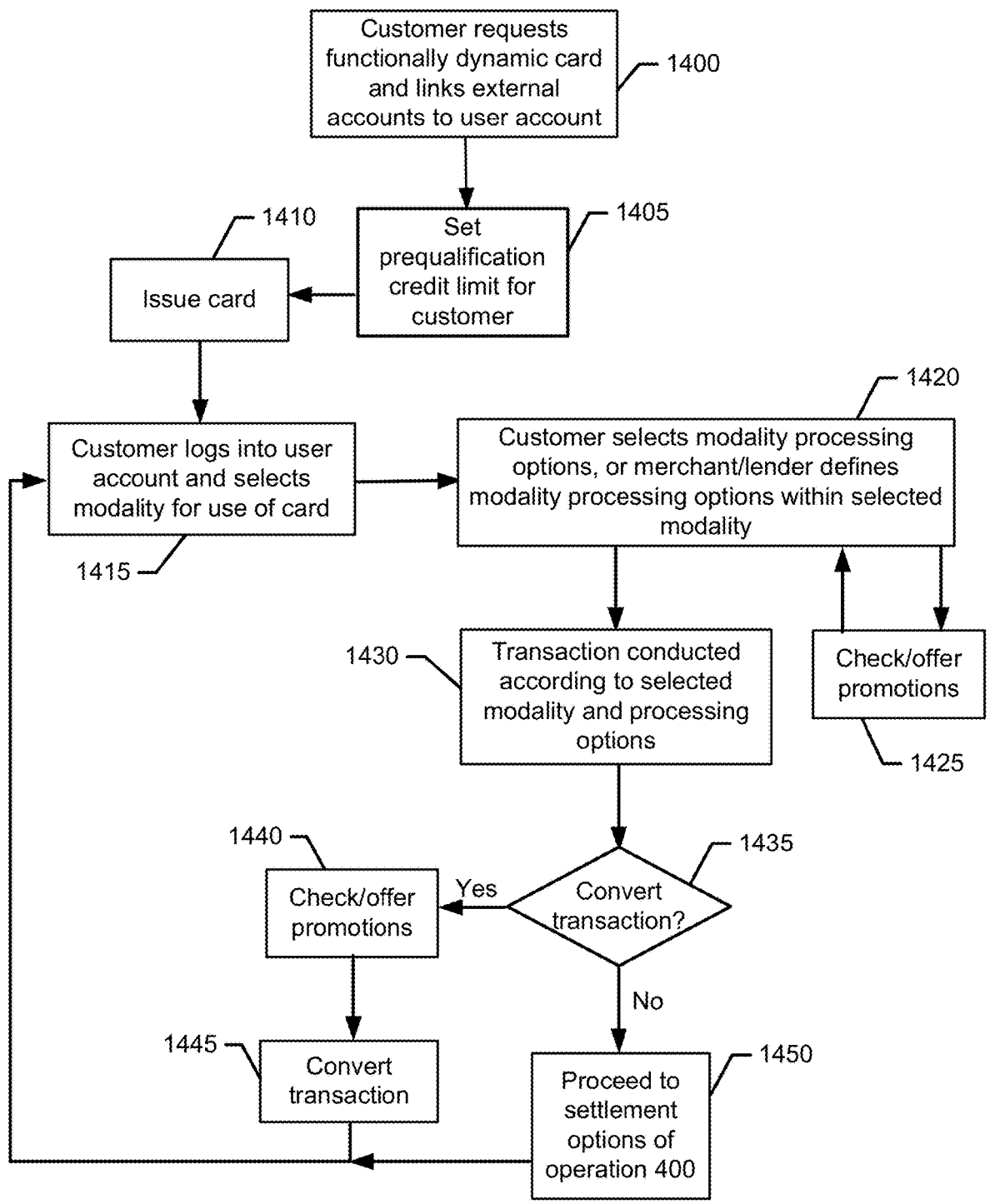
FIG. 14 shows a block diagram of a method for processing a transaction in accordance with an example embodiment.

FIG. 14 illustrates an example control flow diagram associated with activities that may be conducted in support of operation of the functionally dynamic card 800 in accordance with an example embodiment. In this regard, for example, a customer may initially request a functionally dynamic card and link external accounts to create a user account at operation 1400. Thereafter, at operation 1405, a pre-qualification credit limit, daily spend limit, monthly spend limit, or any combination of these may be assigned to the user (e.g. based on the user's credit score or other factors). When the initial prequalification credit limit or spend limit is set, then the functionally dynamic card may be issued to the customer at operation 1410. Thereafter, the customer may log into an application (e.g., the card manager 810) via which the user account may be accessed and managed to select a modality for the functionally dynamic card at operation 1415. The customer may then select deeper levels of modality processing options within the selected modality at operation 1420. Operation 1420 may also or alternatively include the merchant, a lender or other party defining modality processing options within the selected modality. Modality processing options may include, for example, merchant/lender specific terms for processing transactions as a certain modality, conversion options, conversion incentives, custom financing terms, reward program points/credits, deferment periods to wait before settlement to permit possible conversion, etc. Thus, for example, a check of promotions available to be offered to the customer may be performed at operation 1425.

Thereafter, a transaction may be conducted according to the selected modality and any selected processing options at operation 1430. Although not specifically shown, when the customer wishes to convert or process their transaction as a loan, operation 1430 may include a check to confirm that the transaction is approved and is below the prequalification credit limit. If not, the transaction may be declined. However, in some cases, the customer may be provided with other options to secure approval (e.g., making a down payment or reducing the financed amount, etc.). Alternatively, the vendor (or a third party) may offer incentives that enable the transaction to be approved (e.g., taking on risk, subsidizing a loan, etc.). In some cases, when the customer wishes to process their transaction as a debit or credit transaction, there may be a check to confirm the transaction is within their approved spending limit. At some later time (or immediately thereafter), the customer may decide (e.g., responsive to promotion, or for any other reason, but prior to settlement of the transaction) whether to convert the transaction from the selected modality (e.g., debit or credit) to a different type of transaction (e.g., installment loan) at operation 1435. If applicable, promotions may be checked or pushed to the customer at operation 1440. The promotions may incent certain transaction conversions. If persuaded to convert a transaction, the customer may affect the conversion of a selected transaction at operation 1445. Without changing the modality of the functionally dynamic card, the customer may nevertheless alter the way the transaction will be processed by making such conversion. However, if the customer does not make any conversions, processing may proceed to the settlement options provided at operation 400 of FIG. 5 above. Additionally, operation may cycle back to operation 1415 to enable the customer to change modality for the functionally dynamic card either at the time of conversion, settlement, or any other suitable time in the flow illustrated.

The method of FIG. 14 may more generally be described as including receiving an indication of a transaction between a customer and a vendor, where the transaction is conducted in association with a functionally dynamic card issued to the customer. The method may further include determining, based on a user account associated with the customer, a selected modality of the functionally dynamic card, receiving a modality processing option from the customer or the vendor associated with the selected modality, and processing the transaction based on the selected modality and the modality processing option.

In some embodiments, the method (and a corresponding apparatus or system configured to perform the operations of the method) may include (or be configured to perform) additional components/modules, optional operations, and/or the components/operations described above may be modified or augmented. Some examples of modifications, optional operations and augmentations are described below. It should be appreciated that the modifications, optional operations and augmentations may each be added alone, or they may be added cumulatively in any desirable combination. In this regard, for example, receiving the modality processing option may include receiving reward program instructions associating allocation of reward credits or points with the transaction. In an example embodiment, receiving the modality processing option may include receiving custom financing terms for a different modality than the selected modality. In some cases, receiving the modality processing option may include receiving an offer to convert the transaction to an installment loan when the selected modality is a modality other than installment loan processing. In an example embodiment, receiving the offer may include receiving a push message indicating an option to convert to the installment loan. In some cases, the push message may indicate an interest rate associated with the option to convert to the installment loan. In an example embodiment, receiving the modality processing option may include receiving merchant specific terms for converting the transaction to a different modality than the selected modality. In some cases, the method may further include receiving promotional information from a vendor or merchant associated with an alternate modality to the selected modality, and providing a promotional message to the customer associated with converting the transaction to the alternate modality. In an example embodiment, the method may further include receiving an instruction from the customer to convert the transaction from the selected modality to an alternate modality and processing the transaction according to the alternate modality. In some embodiments, the instruction from the customer to convert, the selected modality and the modality processing option may each be received via over-the-air signaling.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. An apparatus for managing communications associated with processing a customer transaction, the apparatus comprising processing circuitry configured to:

communicate, from a server, instructions for storing a first set of code defining a client application executable at a client device of a customer and storing a second set of code defining a card manager at the client device, the client application executing the first set of code to generate a user interface at the client device for interacting with a service application at the apparatus responsive to executing the first set of code;

receive, at the server and via the client application, profile information for defining an account for the customer;

receive, at the server and via the client application, a request for a virtual or physical payment card in association with the account;

receive, at the server and from the card manager, an initial mode selection from a mode selection screen generated by the client application at the client device, the initial mode selection defining a processing mode for future transactions;

receive, at the server, an indication of a transaction between the customer and a vendor, the transaction being initiated via the payment card;

check, at the server, an account status of a primary account of the customer at a customer bank;

determine, at the server and within a predetermined time of the indication, whether to accept or decline the transaction based on the account status;

in response to the transaction being accepted, authorize, at the server, a transfer of funds to the vendor and process the transaction according to the initial mode selection; and define, at the server, a deferment period after the transaction during which the customer, by login via the client application and using the card manager, accesses the transaction to display via the card manager at the client device and through the client application, a change mode button, a check promotion button, and a convert transactions button that, when selected, further causes display of the transaction within a list of transactions to enable selection of the transaction to generate a first selectable graphical display element defining a first option to settle the transaction immediately and a second selectable graphical display element defining a second option to defer settlement of the transaction by processing the transaction as an installment loan, wherein the change mode button is selected by the customer to change from the initial mode selection to a different processing mode for a subsequent transaction, wherein the check promotion button is selected to review one or more promotions for which the customer is eligible as determined by the server, and wherein a promotion notification is displayed simultaneously with the change mode button, the check promotion button, and the convert transactions button to indicate that the transaction qualifies for at least one promotion accessible by selection of the check promotion button.

2. The apparatus of claim 1, wherein the processing circuitry is configured to check the account status of the primary account by checking an account balance of a checking account or savings account of the customer at the customer bank.

3. The apparatus of claim 2, wherein the processing circuitry is configured to determine whether to accept or decline the transaction by:
accepting the transaction if the account balance is greater than an amount of the transaction; and
declining the transaction if the account balance is less than the amount of the transaction.

4. The apparatus of claim 3, wherein the predetermined time is about 3 seconds.

5. The apparatus of claim 3, wherein the processing circuitry is configured to communicate with the customer by initiating contact with the customer in advance of expiration of the deferment period.

6. The apparatus of claim 5, wherein the processing circuitry is configured to communicate with the customer by offering one or more selectable payment period options over which the customer makes payments toward the transaction to service the installment loan.

7. The apparatus of claim 3, wherein the processing circuitry is configured to communicate with the customer by receiving messages initiated by the customer in advance of expiration of the deferment period.

8. The apparatus of claim 3, wherein the processing circuitry is configured to communicate with the customer by receiving direction from the customer to settle the transaction immediately, and
wherein responsive to the direction, a payment service is engaged to transfer funds from the primary account to an issuing bank that transferred funds to the vendor.

9. The apparatus of claim 1, wherein, responsive to expiration of the deferment period prior to receiving an instruction to settle the transaction immediately or process the transaction as the installment loan, the transaction is handled as the installment loan by default.

10. The apparatus of claim 1, wherein a plurality of transactions are bundled for the customer prior to settlement of the transactions with the customer bank.

11. A method for managing communications associated with processing a customer transaction, the method comprising:
communicating, from a server, instructions for storing a first set of code defining a client application executable at a client device of a customer and storing a second set of code defining a card manager at the client device, the client application executing the first set of code to generate a user interface at the client device for interacting with a service application at the apparatus responsive to executing the first set of code;
receiving, at the server and via the client application, profile information for defining an account for the customer;
receiving, at the server and via the client application, a request for a virtual or physical payment card in association with the account;
receiving, at the server and from the card manager, an initial mode selection from a mode selection screen generated by the client application at the client device, the initial mode selection defining a processing mode for future transactions;
receiving, at the server, an indication of a transaction between the customer and a vendor, the transaction being initiated via the payment card;
checking, at the server, an account status of a primary account of the customer at a customer bank;
determining, at the server and within a predetermined time of the indication, whether to accept or decline the transaction based on the account status;
in response to the transaction being accepted, authorizing, at the server, a transfer of funds to the vendor and process the transaction according to the initial mode selection; and
defining, at the server, a deferment period after the transaction during which the customer, by login via the client application and using the card manager, accesses the transaction to display via the card manager at the client device through the client application, a change mode button, a check promotion button, and a convert transactions button that, when selected, further causes display of the transaction within a list of transactions to enable selection of the transaction to generate a first selectable graphical display element defining a first option to settle the transaction immediately and a second selectable graphical display element defining a second option to defer settlement of the transaction by processing the transaction as an installment loan, wherein the change mode button is selected by the customer to change from the initial mode selection to a different processing mode for a subsequent transaction, wherein the check promotion button is selected to review one or more promotions for which the customer is eligible as determined by the server, and wherein a promotion notification is displayed simultaneously with the change mode button, the check promotion button, and the convert transactions button to indicate that the transaction qualifies for at least one promotion accessible by selection of the check promotion button.

12. The method of claim 11, wherein checking the account status of the primary account comprises checking an account balance of a checking account or savings account of the customer at the customer bank.

13. The method of claim 12, wherein determining whether to accept or decline the transaction comprises:
accepting the transaction if the account balance is greater than an amount of the transaction; and
declining the transaction if the account balance is less than the amount of the transaction.

14. The method of claim 13, wherein the predetermined time is about 3 seconds.

15. The method of claim 13, further comprising communicating with the customer by initiating contact with the customer, via the client application, in advance of expiration of the deferment period or receiving messages initiated by the customer, via the client application, in advance of expiration of the deferment period.

16. The method of claim 15, wherein communicating with the customer comprises offering one or more selectable payment period options over which the customer makes payments toward the transaction to service the installment loan.

17. The method of claim 15, wherein communicating with the customer comprises receiving direction from the customer to settle the transaction immediately, and
   wherein responsive to the direction, a payment service is engaged to transfer funds from the primary account to an issuing bank that transferred funds to the vendor.

18. The method of claim 13, wherein, responsive to expiration of the deferment period prior to receiving an instruction to settle the transaction immediately or process the transaction as the installment loan, the transaction is handled as the installment loan by default.

19. The method of claim 11, wherein a plurality of transactions are bundled for the customer prior to settlement of the transactions with the customer bank.

\* \* \* \* \*